United States Patent [19]

Salazar

[11] Patent Number: 5,259,063
[45] Date of Patent: Nov. 2, 1993

[54] RECONFIGURABLE FUZZY CELL

[75] Inventor: George A. Salazar, Katy, Tex.

[73] Assignee: The United States of America as represented by the Administrator, National Aeronautics and Space Administration, Washington, D.C.

[21] Appl. No.: 761,566

[22] Filed: Sep. 18, 1991

[51] Int. Cl.$^5$ .................. G06F 9/44; G05B 13/00
[52] U.S. Cl. .................................. 395/3; 395/61; 395/900
[58] Field of Search .................... 395/3, 906, 61, 900

[56] References Cited

U.S. PATENT DOCUMENTS

| | | | |
|---|---|---|---|
| 3,880,352 | 4/1975 | Ishida et al. | 235/150.1 |
| 4,694,418 | 9/1987 | Ueno et al. | 364/807 |
| 4,716,540 | 12/1987 | Yamakawa | 364/807 |
| 4,809,175 | 2/1989 | Hosaka et al. | 364/424 |
| 4,809,222 | 2/1989 | Van Den Heuvel | 365/45 |
| 4,837,725 | 6/1989 | Yamakawa | 364/807 |
| 5,140,669 | 8/1992 | Zhang | 395/3 |
| 5,167,005 | 11/1992 | Yamakawa | 395/3 |

FOREIGN PATENT DOCUMENTS 2-132502 5/1990 Japan .

OTHER PUBLICATIONS

"Outline of a New Approach to the Analysis of Complex Systems and Decision Processes," Lotfi, A. Zadeh, IEEE Transactions on Systems, Jan. 1973, vol. SMC-3, No. 1, pp. 28-44.
"Making Computers Think like People," Lotfi A. Zadeh, IEEE Spectrum, Aug. 1984, pp. 26-32.
Williams, T., "Fuzzy Logic Simplifies Complex Control Problems", Computer Design, Mar. 1991, 90-102.
Watanabe et al., "VLSI Fuzzy Chip and Inference Accellerator Board Systems", Proc. 21st Intl. Symp. Multi-Valued Logic, May 1991, 120-127.
Togai et al., "Expert System on a Chip: An Engine for Real-Time Approximate Reasoning", IEEE Expert, Fall 1986, 55-62.
Chiu et al., "Real-Time Control: From Linguistic Rules to Implementation on a Chip", Methodologies for Intelligent Systems; Proc. 2nd Intl. Conf., Oct. 1987, 17-24.
Dettloff et al., "A Fuzzy Logic Controller with Reconfigurable, Cascadable Architecture", Proc. 1989, IEEE Conf. on Computer Design, 1989, 474-478.
Zhijian et al., "A CMOS Current-Mode High Speed Fuzzy Logic Microprocessor for A Real-Time Expert System", Proc. 20th Intl. Sym. Multi-Valued Logic, May 1990, 394-400.
Mamdani et al., "Process Control Using Fuzzy Logic," Fuzzy Sets-Theory and Applications to Policy Analysis and Information Systems, 1980, 249-265.

Primary Examiner—Michael R. Fleming
Assistant Examiner—Robert W. Downs
Attorney, Agent, or Firm—Hardie R. Barr; Guy M. Miller; Edward K. Fein

[57] ABSTRACT

A reconfigurable fuzzy cell comprising a digital control programmable gain operation amplifier, an analog-to-digital converter, an electrically erasable PROM, and 8-bit counter and comparator, and supporting logic configured to achieve in real-time fuzzy systems high throughput, grade-of-membership or membership-value conversion of multi-input sensor data. The present invention provides a flexible multiplexing-capable configuration, implemented entirely in hardware, for effectuating S-, Z-, and PI-membership functions or combinations thereof, based upon fuzzy logic level-set theory. A membership value table storing "knowledge-data" for each of S-, Z-, and PI-functions is contained within a nonvolatile memory for storing bits of membership and parametric information in a plurality of address spaces. Based upon parametric and control signals, analog sensor data is digitized and converted into grade-of-membership data. In situ learn and reconfiguration modes of operation are also provided.

20 Claims, 13 Drawing Sheets

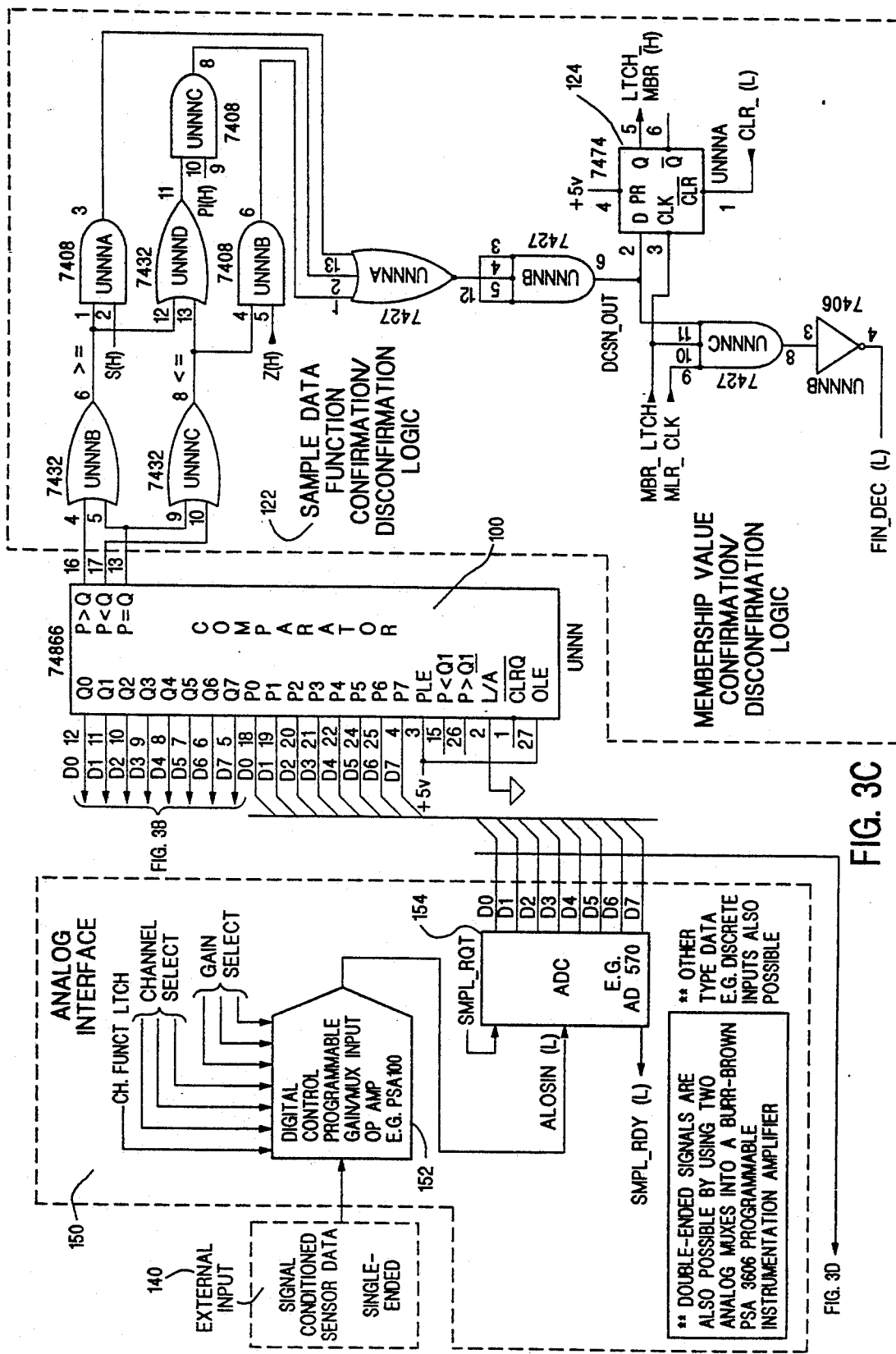

RECONFIGURABLE FUZZY CELL

ORIGIN OF INVENTION

The invention described herein was made by an employee of the United States Government and may be manufactured and used by or for the Government of the United States of America for governmental purposes without payment of any royalties thereon or therefor.

FIELD OF INVENTION

This invention relates to fuzzy logic circuits, and more particularly relates to hardware configurations for realizing typical fuzzy membership Z-, S-, and PI-functions, or hybrid functions thereof.

BACKGROUND OF INVENTION

Fuzzy logic systems are based upon a control methodology intended to emulate and exploit the vagueness inherent in the human thinking process. The "fuzzy" approach to analyzing complex systems and decision processes is described by L. A. Zadeh in the IEEE Transactions on Systems, January 1973, vol. SMC-3, no. 1, pp. 28-44 and IEEE Spectrum, August 1984, pp. 26-32.

Fuzzy logic bases decisions on input in the form of linguistic variables with malleable boundaries instead of conventional quantitative variables with firm boundaries. For instance, instead of describing a typical summer's day in the southwest region of the United States as having a temperature of 95° F. and a relative humidity of 90%, the fuzzy approach might described the weather linguistically as "hot and humid." This, of course, is more likely to be the way a human would describe the weather: not only in fuzzy or vague terms, but also by classifying the particular sensed conditions of temperature and humidity into previously experienced buckets or sets. Thus, the term "humid" might apply to relative humidity above 50%. Similarly, the term "hot" might apply to temperatures above 80° F. These classifications can also be tempered by such qualifications as "somewhat" or "very."

Thus, by receiving inputs in the form of linguistic variables, fuzzy set theory provides a method for an approximate characterization of complex or amorphous phenomena or processes. Data are assigned to fuzzy sets based upon the degree of membership therein, which ranges from 0 (no membership) to 1.0 (full membership). Fuzzy set theory uses membership functions to determine the fuzzy set or sets to which a particular data value belongs and its degree of membership therein. Such degree of membership is typically plotted in Z-, S-, and PI functions. This approach relaxes sensor accuracy requirements as opposed to traditional logic that places several constraints thereon. Fuzzy logic allows control decisions in spite of lack of absolute accuracy from sensor data. Nevertheless, the accuracy of the sensor would be sufficient to determine if the data belongs to a particular fuzzy set.

An inherent benefit of fuzzy systems is that sensor data is constantly being received and analyzed, notwithstanding system complexities and uncertainties. Accordingly, it is important that a practical fuzzy system have the capability to process this large volume of data and make appropriate adjustments and decisions preferably in real time. There have been some recent improvements in the prior art in effort to render fuzzy logic and set theory applicable to real time processes.

For example, in U.S. Pat. No. 4,809,175 issued to Hosaka, et al., is disclosed a vehicle control system and related method which performs analog to grade-of-membership conversions by way of software. In accordance with that invention, depending upon the particular hardware being used, several machine instruction cycles will occur for each membership grade determination. Since additional instructions are required for ascertaining by interpolation, values not contained in a memory-resident discourse table, response times are degraded, thereby rendering this art not applicable to high-speed real time fuzzy systems due to a tendency to overload. Another limitation of that invention is that the analog interface fails to provide an on-line rescaling capability for sensor data. Accordingly, in an application in which sensors are changed, the level converter's scaling hardware would necessarily require physical change-out. It should be apparent to those skilled in the art that such hardware change-outs are impractical for real time environments. In addition, the invention is not suitable for military or space applications because power surges would erase membership values which are stored in volatile memory, thereby necessitating reload and recalculation operations.

U.S. Pat. Nos. 4,694,418; 4,716,540; and 4,837,725, issued to Yamakawa, et al., disclose fuzzy membership function integrated circuitry which have high implementation costs because an actual working system is custom-built, thereby requiring additional hardware. The Yamakawa fuzzy logic integrated circuits lack the controls required for use in distributed high-speed and real time fuzzy systems. These devices generate analog output requiring an analog-to-digital conversion before being processed by a digital computer. Furthermore, these chips only provide for analog input signals. In addition, the Yamakawa integrated circuits do not provide for on-line raw data acquisition or the rescaling thereof relative to learning new processes when sensors are added or changed. Furthermore, these integrated circuits are not useful for space and military applications because they are not constructed for these environments.

Accordingly, these limitations and disadvantages of the prior art are overcome with the present invention, and improved means and techniques are provided which are especially useful for implementing embedded, high-throughput fuzzy systems in real time.

SUMMARY OF INVENTION

As will be described in detail, the preferred embodiment of the present invention comprises a digital control programmable gain/multiplex operation amplifier (PGMA), an analog-to-digital converter (ADC), an electrically erasable PROM (EEPROM), 8-bit counter and comparator, and supporting logic configured to achieve in real-time, fuzzy systems with high throughput, grade-of-membership or membership-value conversion of multi-input sensor data.

The present invention provides a flexible multiplexing-capable configuration for effectuating S-, Z-, and PI-membership value functions or combinations thereof, based upon fuzzy logic level-set theory. More particularly, an in situ reconfigurable cell for converting raw analog sensor data into grade-of-membership fuzzy sets based upon comparison with such S-, Z-, or PI-function level-set is provided. The instant reconfigurable fuzzy cell includes nonvolatile memory means for storing bits of membership and parametric information in a plurality of address spaces. A membership value table contained within this memory stores "knowledge-data" or level-set data for each of these functions. A data/parameter interface means is also provided for storing and transmitting parametric signals corresponding to function, gain, and channel selection parameters. A control circuit means is provided for controlling and coordinating the operation of the reconfigurable cell by generating control signals and using the parametric signals transmitted by the data/parameter interface means.

Responsive to such control signals, and disposed medially of a suitable computer and the instant reconfigurable fuzzy cell, is a bus interface circuit means for transmitting the parametric information to the data/parameter interface means and also for transmitting the grade-of-membership fuzzy sets to the computer. An analog interface means containing a plurality of sensor channels receives and converts analog sensor data into digital representation, in accordance with the transmitted parametric signals. In accordance with the present invention, a reconfigurable fuzzy cell is provided which not only converts analog sensor data into grade-of-membership data, but also is capable of a "learn" mode for acquiring raw digitized sensor data and a "reconfiguration" mode for accommodating, in situ and entirely in hardware, changes related to the relevant membership functions.

It is an object and feature of the present invention that high-speed analog-to-grade-of-membership and raw digital conversions be performed all by hardware and be available simultaneously within only one conversion cycle.

It is another object of the present invention to provide a fuzzy logic apparatus and method with a data acquisition mode feature to allow learning of newly replaced or added sensors and signal conditioners by acquiring raw digital data from the process to formulate a membership function by a central controller.

It is an advantage and object of the present invention to provide a reconfigurable membership table located in non-volatile memory while the reconfigurable cell remains on-line with readback capability.

It is still another object of the present invention to provide fuzzy logic apparatus and method with a selectable membership function, channel selection, and scaling factor for multiple input sensor channels while remaining on-line. It is another object of the present invention to provide fuzzy logic apparatus and method for membership conversion and digital data conversion completion flag for interrupt driven, real time fuzzy systems.

It is yet another object of the present invention to provide novel hardware architecture that allows combining existing off-the-shelf components for implementing an embedded fuzzy logic system that performs fuzzy set operations based on level-sets with high performance and low-cost benefits realized.

It is another object of the present invention to provide fuzzy logic apparatus and method with the capability of hybridizing to a single chip due to availability of ordinary standard components as well as realizing space or military fuzzy cells since components for these specialized applications exist and are readily available.

It is another object of the present invention to provide fuzzy logic apparatus and method which require no hardware change-outs when new or modified membership functions or rescaling of a newly installed sensor or signal conditioner for a particular channel are required.

It is yet another object of the present invention to provide fuzzy logic apparatus and method with the feature of a mixture of learning and analog-to-membership and digital data conversions in real time.

It is another object of the present invention to provide fuzzy logic apparatus and method which accommodates complex membership functions in addition to Z, S, and PI functions.

It is yet another object of the present invention to provide fuzzy logic apparatus and method which may independently program a number of membership levels for each channel.

It is a specific object of the present invention to provide, in a computer system, an in situ reconfigurable fuzzy cell for converting raw analog sensor data into grade-of-membership fuzzy sets based upon comparison with a Z-, S-, or PI-function level-set, or a hybrid thereof, comprising: nonvolatile memory means for storing bits of membership and parametric information in a plurality of address spaces; control circuit means for controlling and coordinating the operation of the reconfigurable fuzzy cell by generating control signals and using parametric signals; data/parameter interface means including gain, function and channel selection parameters for storing and transmitting the parametric signals, and further including raw digital sensor data storage means and level-set membership data storage means; analog interface circuit means responsive to the control signals and containing a plurality of sensor channels, for receiving and converting the analog sensor data into digital representation responsive to the parametric signals; the analog interface circuit means including a programmable gain operational amplifier means for scaling the sensor data based upon the parametric signals; membership value circuit means responsive to the control signals for determining the degree of membership of the digital representation of the sensor data in the level-set selected based upon the parametric signals; the membership value circuit comprising: membership table means contained in the nonvolatile memory means and storing level-set data for each function; line switcher means to select the appropriate one of the plurality of address spaces in the nonvolatile memory means containing level-set data for comparison with the digital representation of sensor data; comparator means to deduce grade-of-membership; membership value generating means for retrieving the level-set data based upon the address spaces selected by the line switcher means, for comparison with the digital representation of sensor data in the comparator means; and confirmation/disconfirmation means for evaluating the output of comparator means and feeding back the result thereof to the membership value circuit means; and bus interface circuit means also responsive to the control signals, for transmitting parametric information to the data/parameter interface means and transmitting grade-of-membership fuzzy sets and digital representation of sensor data to the computer system.

These and other objects and features of the present invention will become apparent from the following detailed description, wherein reference is made to the figures in the accompanying drawings.

IN THE DRAWINGS

FIG. 3C is a simplified schematic diagram depicting membership value confirmation/disconfirmation logic circuitry and control line buffer/switcher circuitry embodying the present invention.

DETAILED DESCRIPTION

Figure 1:
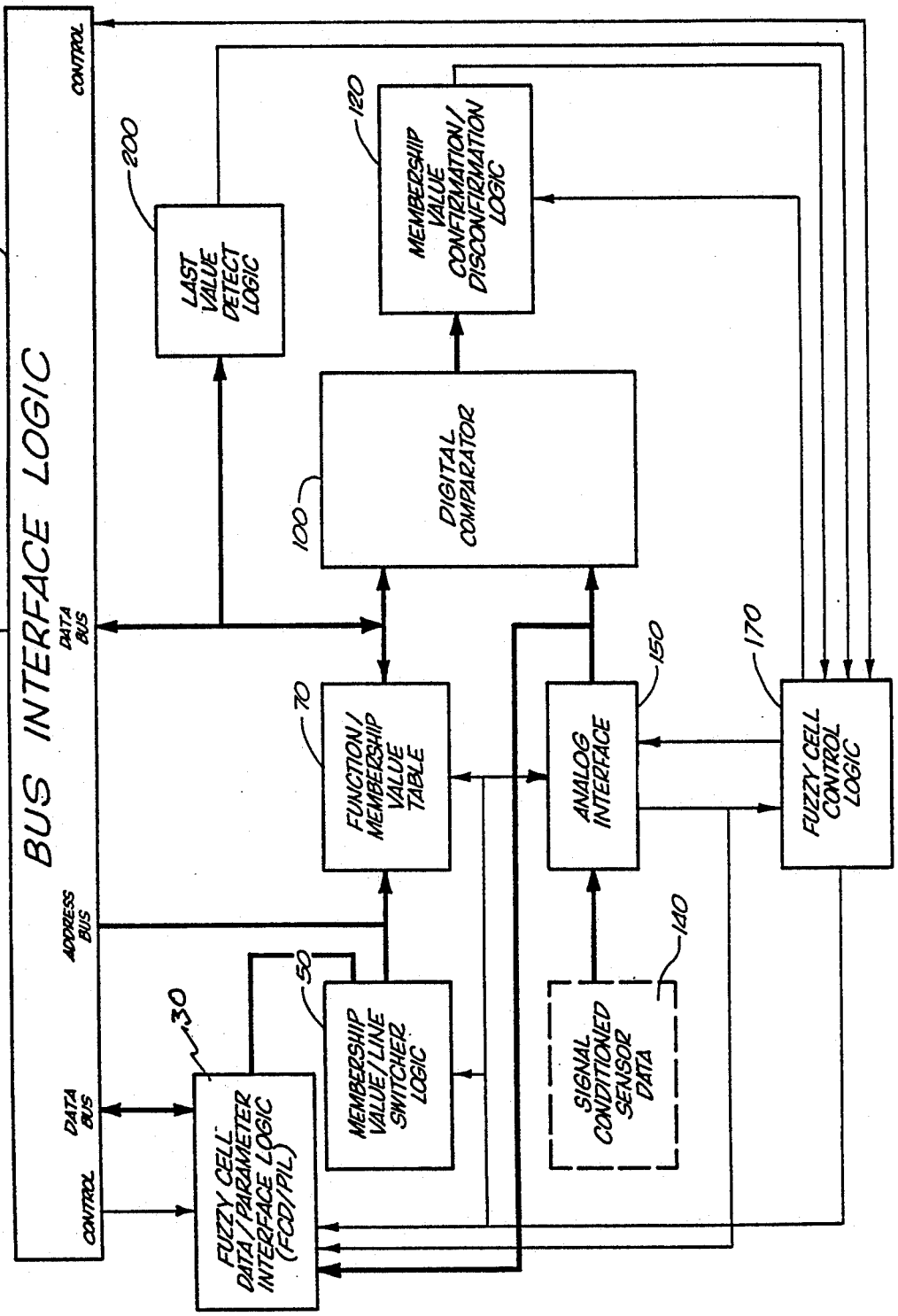
FIG. 1 is a block diagram depicting an in situ reconfigurable fuzzy cell in accordance with the present invention.

Now referring to FIG. 1 there is depicted a block diagram of an in situ reconfigurable fuzzy cell embodying the present invention. More particularly, there is shown bus interface logic block 10, fuzzy cell data/parameter interface logic block 30, membership value/line switcher logic block 50, function/membership value table block 70, digital comparator block 140, interface block 150, signal conditioned sensor data block 140, membership value confirmation/disconfirmation logic block 120, last value detect logic block 200, and fuzzy cell control logic block 170 that comprise an electronic digital/analog circuit for embedded real-time fuzzy control in accordance with the present invention.

The instant cell operates with a computer having a simple input/output interface. The computer controls the three modes of the cell: the start of the analog to grade-of-membership (or membership value) conversion, the learn mode for acquiring raw digitized sensor data only, or reconfiguring the Membership Value Table (MVT). In accordance with the present invention, for the conversion process, the computer first selects the sensor data channel from signal conditioned sensor data 140 that is to be sampled, the appropriate scaling of that channel, and selection of the channel's memory block in MVT 70 by sending this cell configuration information to analog interface 150 and MVT 70 via data/parameter interface logic 30. The selected channel's section of memory (or memory block) in MVT 70 contains the "knowledge-data" for converting the digitized data sample into its memership value.

Membership value/line switcher logic 50 generates the addresses that access the data within the section of memory. The cell configuration information from data/parameter interface logic 30 also enables the appropriate circuitry in membership value/line switcher logic 50 and membership value confirmation/disconfirmation 120 as will be hereinafter explained in detail. The computer then issues a start conversion signal from bus interface logic 10 to analog interface 150.

Still referring to FIG. 1, the analog interface 150 converts the analog sampled channel into its corresponding binary representation, i.e., its corresponding digitized data sample. When the analog-to digital (A/D) conversion is complete, the digitized sample is sent to data/parameter interface logic 30 and digital comparator 100. In addition, analog interface 150 outputs a sample ready signal indicating that the digitized sample is ready. This signal latches the sample in data/parameter interface logic 30 and also activates fuzzy cell control logic 170. During the conversion process, control logic 170 of the instant cell takes control of the grade-of-membership conversion process by sending control signals to membership value/line switcher logic 50, MVT 70, and membership value confirmation/disconfirmation logic 120. MVT 70 receives control signals from control logic 170 and is enabled, whereby its contents, specified by the addresses from membership value/line switcher logic 50, are outputted to digital comparator 100 and last value detect logic 200.

In accordance with the present invention, digital comparator 100 logically compares the knowledge-data contents located in the channel's memory section of MVT 70 against the digitized sample. Last value detect logic 200 checks the last value flag to ascertain whether the membership value has reached 1.0, whereupon the conversion cycle is terminated. For each comparison in digital comparator 100, the output results are sent to membership value confirmation/disconfirmation logic 120 which determines if the digitized sample from analog interface 150 is a member of the knowledge-data. If it is, a signal from the output of membership value confirmation/disconfirmation logic 120 along with a synchronizing clock signal from control logic 170 generates a latch signal. This signal latches the current address generated from membership value/line switcher logic 50 which represents the membership value of the digitized sample. Then, membership value/line switcher logic 50 increments to the next address in the memory block using a control signal from control logic 170.

In accordance with the present invention, this process continues until the grade-of-membership is found. Once the membership value of the digitized sample is determined, either by detection of the last value flag or data sample no longer being within the knowledge-data, control logic 170 issues an interrupt to the computer. This indicates that the conversion is complete and proceeds to re-initialize the cell for the next conversion. Hence, once the processor issues a start conversion, the instant cell operates autonomously until the membership value of the digitized sample from analog interface 150 is determined.

As will become apparent to those skilled in the art, the knowledge-data in MVT 70 is the digital information for each sensor channel used to convert the raw digitized sensor data sample into its grade of membership or membership value. The data is arranged as a membership function for the sensor channel. The function could be either a S-, Z-, or PI-function, or combinations thereof.

Under the teachings of the present invention, its second mode of operation, the learn mode, allows the controlling computer system to acquire raw digitized data from a sensor channel. This mode allows a real-time fuzzy logic system to learn a new process or re-learn from a newly installed sensor. For example, at predictable times in process control facilities, a channel must be changed from a pressure measurement to a temperature measurement. At other times, the sensor must be replaced with one that monitors higher or lower readings. As another example, a pressure sensor that reads from 0 to 14.7 psi may be replaced with a sensor that must read from 0 to 250 psi. In addition, the membership function may change. Consequently, such a learn mode allows a fuzzy logic computer system to acquire raw digitized data and determine the new membership function or knowledge-data for the sensor channel. Afterwards, the computer downloads the new knowledge-data into the channel's memory block in MVT 70 which can occur while the instant cell is on-line.

The present invention's third mode of operation, the reconfigure mode, allows a computer system to update MVT 70 (makeup of a non-volatile read/write memory device) while the instant cell remains on-line. This typically occurs when new knowledge-data must be loaded into MVT 70, such as after a learn mode has occurred. Each sensor channel is assigned a section of memory containing the knowledge-data for determining the membership value of a digitized sample from that channel. To invoke this mode, the computer first inhibits the instant cell before reconfiguring MVT 70. This allows computer control access to MVT 70 via the instant cell's arbitration control logic in control logic 170 to MVT 70. Next, the computer downloads the data into MVT 70. It is an advantage of the present invention that readback capability exists to verify that the data written into memory were loaded properly.

Still referring to FIG. 1, an explanation of each section of the instant cell depicted therein follows. Fuzzy cell data/parameter interface logic 30 allows raw digitized data, membership value, and cell parameter capture to occur. Raw digitized data capture occurs when analog interface 150 has digitized a sample of sensor data from signal conditioned sensor data 140 after receiving a start A/D conversion signal from the computer. The output of analog interface 150 is the raw digitized sample and its associated sample ready signal indicating that the sample is ready for processing. These two outputs are received by data/parameter interface logic 30. The sample ready signal latches the digitized sample in data/parameter interface logic 30 which is now retrievable by the computer at any time through bus interface logic 10. In accordance with the present invention, raw digitized data capture occurs when either the cell is in the learn mode or when the cell is performing an analog to grade-of-membership conversion.

Membership value capture occurs when the instant cell is determining the membership value of the digitized data sample from analog interface 150. The membership value captured is represented by the address output of membership value/line switcher logic 50. This value is latched into data/parameter interface logic 30 using a latching control signal from membership value confirmation/disconfirmation logic 120. The latching control signal is generated each time the sample from analog interface 150 is compared with the knowledge-data, one byte at a time, in MVT 70 for a particular sensor channel and found to meet the confirmation decision criteria of digital comparator 100 and membership value confirmation/disconfirmation logic 120.

Cell parameter capture occurs when the computer sends cell parameters for either determining the membership value of digitized sensor data from analog interface 150 or when the computer must reconfigure the instant cell's MVT 70. The cell parameters are directly loaded into data/parameter interface logic 30 (latched) by the computer. The parameters consists of channel select, gain select, and function select bits. The channel and gain bits are used to configure analog interface 150. These bits select and scale the specified sensor channel before it is digitized. The combination of the channel and function bits from data/parameter interface logic 30 also constitutes the sensor channel's memory section address space in MVT 70. For reconfiguring MVT 70, the computer sends channel and function bits required for selecting the appropriate section of memory. The gain bits are "don't cares" since the computer will not start an A/D conversion when reconfiguring the table. Each sensor channel has a section of memory in MVT 70 allocated to it containing the knowledge-data for determining the membership value of a digitized sensor channel. The knowledge-data located in MVT 70 represents the abscissa of the membership function and the membership value reprsented by the addresses from membership value/line switcher logic 50, the ordinate.

The function select bits consist of three bits called S-, Z-, and PI. These bits also select/enable the appropriate decision circuitry in membership value confirmation/disconfirmation logic 120 and address buffer in membership value/line switcher logic 50. The decision circuitry in membership value confirmation/disconfirmation logic 120 is a combinational circuit consisting three sections for evaluating S-, Z-, and PI-functions. These sections are enabled by the function select bits. The bits are all mutually exclusive; that is, only one is asserted at any particular time. Consequently, only one decision circuit is active during an analog to grade-of-membership conversion.

It is a feature of the present invention that computer control for retrieving the digitized sample, the membership value, and loading cell parameters bypasses the cell control logic 170. This approach prevents control logic 170 from locking out computer to data/parameter interface logic 30 when access thereto is required.

In accordance with the present invention, membership value/line switcher logic 50 generates the addresses that outputs the data contents of MVT 70. As should be clear to those skilled in the art, these addresses represent membership values. The addresses are the binary representation of membership values. For example, address 00H, 01H, 02H, up to 09H represent membership values of 0, 0.1, 0.2, up to 1.0, respectively. These addresses, generated by a counter, are used to determine the membership value of the digitized data sample outputted from analog interface 150. The addresses from membership value/line switcher logic 50 constitute the lower portion of the address space in MVT 70 for a given channel. The upper address in MVT 70 is composed of the channel and function select bits from data/parameter interface logic 30 which address the particular sensor channel's section of memory. However, unlike the channel and function bits which remain static, the addresses from membership value/line switcher logic 50 change during an analog to grade-of-membership conversion.

Each time an address from membership value/line switcher logic 50 is generated, it is used as an input address to MVT 70 where the knowledge-data resides. In accordance with the present invention, for every address generated, a knowledge-data byte is outputted from MVT 70 which is then used to compare against the digitized data sample from analog interface 150 in digital comparator 100. The results of the comparison in digital comparator 100 are outputted to membership value confirmation/disconfirmation logic 120 where this logic decides if the sample from analog interface 150 is within the domain of the knowledge-data. If so, then membership value confirmation/disconfirmation logic 120 sends a latch signal to data/parameter interface logic 30 where it latches the current address from membership value/line switcher logic 50. The counter is incremented by control logic 170 and the process is repeated until the grade-of-membership (or membership value) of the digitized sample from analog interface 150 is determined or the end flag located in MVT 70 is detected in last value detect logic 200.

The membership value/line switcher logic also contains a pair of buffers whose outputs are shared. These outputs provide to MVT 70 the addresses generated by the counter. These addresses serve to access the address space within the section selected by the channel and function bits. Only one buffer is active during any analog-to-membership value conversion. In accordance with the present invention, the purpose of the buffers is to switch the parallel address lines coming from the counter depending if the conversion pertains to S-, Z-, and PI-function operations. S- and Z- function operations require that the addresses increment sequentially upward from zero. Therefore, the buffer associated with these operations allows the address generated by the counter to go unaltered into the address input of MVT 70.

For PI-function operations, the situation is different: PI-functions are bell-shaped requiring comparing two data points from the upper and lower half of the function for each membership value. Consequently, each membership value, the ordinate, has two knowledge-data points, the abscissa, from MVT 70 associated with it. The upper half of the function is the right half of the curve, and the lower half is the left half, symmetrical about the center of the function. The memory section in MVT 70 for PI-function sensor channels is divided in half, upper and lower. Therefore, the addresses generated within the section of memory must incrementally switch from the lower portion of memory to the upper portion for that channel in an alternating fashion, with the lower half of memory within the section containing the upper half of knowledge-data of the function and the upper half of memory containing the lower half of the data. Comparisons are incrementally made at both lower and upper addresses, with the lower address comparison occurring first.

To accomplish this, a second buffer is provided which is wired to the address inputs of MVT 70 such that the addresses appear shifted from the output of the counter to the right, making the counter's least significant bit (LSB) now the most significant bit (MSB) input in MVT 70, the most significant bit now the second to the most significant bit in the MVT, second most significant bit now the third most significant bit in the MVT . . . the second least significant bit now the least significant bit in the MVT 70. With the counter's LSB now the MSB input to MVT 70 address space for a given section, each time the counter increments, it selects data values in the MVT from the lower address space ($A_0=0$) and then upper ($A_0=1$).

It should be evident to those skilled in the art that it is still the counter's output from membership value/line switcher logic 50 that is latched in data/parameter interface logic 30 when the grade-of-membership of the digitized sample is being determined. However, the computer must shift the contents of the membership value latch in data/parameter interface logic 30 to the right and discard the LBS to arrive at the correct membership value of the sample since the LSB of the counter is used for address switching.

In accordance with the preferred embodiment, to keep the design simple, the buffers' outputs are intertwined together. These intertwined outputs now serve as the inputs into MVT 70. The inputs into both buffers from the counter encounter the same address bits. For Z- and S-functions the upper buffer is wired into the input of MVT 70 for normal sequential address generation thereinto. The lower buffer outputs are wired to the output of the upper buffer with the counter address shifted right: $A_0$ of upper buffer (UB) intertwined with $A_1$ of lower buffer (LB), $A_1$ of UB with $A_2$ of LB, $A_2$ of UB with $A_3$ of LB, $A_3$ of UB with $A_4$ of LB, $A_4$ of UB with $A_5$ of LB, and $A_5$ (MSB) of UB with $A_0$ of LB. Only when the PI-function operation occurs (PI-function bit from data/parameter interface logic 30 asserted) is this buffer enabled.

It should be clear that MVT 70 is a read/write non-volatile memory device that store the knowledge-data of the sensor channels with a limited number of addresses containing the data. The device is partitioned into sections or blocks of memory for each sensor channel. Each block is a section of memory with a multitude of knowledge-data bytes or words used to compare against the digitized sample in digital comparator 100 and membership value confirmation/disconfirmation logic 120. The channel and function select bits from data/parameter interface logic 30 makeup the upper address to select the appropriate sensor channel section of memory. The addresses from membership value/line switcher logic 50 constitute the address space of that sector. Then, during the analog to grade-of-membership conversion, each address generated by membership value/line switcher logic 50 and sent through the line switcher is used to output the contents of MVT 70 at that particular address. The contents are used to compare against the digitized sensor channel sample using digital comparator 100 and membership value confirmation/disconfirmation logic 120.

Control of MVT 70 occurs through control logic 170 for writing new data thereinto by the computer or enabling it when the instant cell is performing an analog to grade-of-membership conversion. For reconfiguring the table, the computer sends control read/write signals to control logic 170 which are then sent to the control inputs thereof. The fuzzy cell control logic 170 arbitrates control access to the MVT from either the computer or the instant cell. The data written into MVT 70 is sent via bus interface logic 10 using data, address, and control signals from the computer. During an analog to grade-of-membership conversion, the data outputted from MVT 70 for each address from membership value/line switcher logic 50 is sent to digital comparator 100 and to last value detect logic 200. Last value detect logic 200 looks for the last value flag to end the conversion when the membership value of the digitized sample reaches 1.0. The knowledge-data for a given sensor channel begins at the first address in the section of memory with the membership threshold byte. This occurs for Z- and S-functions which have only one threshold byte. For PI-functions, the first two data values outputted from MVT 70 represent the threshold values, upper and lower. These values are located in the first memory locations in the lower and upper half of the sensor channel's memory block. The threshold bytes perform an initial check to see if the digitized sample is within the domain of the knowledge-data. If it is, the conversion continues. If not, the process is terminated. The rest of the data represents the abscissa function with the last byte being the last value flag in the section memory.

In accordance with the present invention, digital comparator 100 is a combinational circuit that logically compares the output data from MVT 70 against digitized data sample from analog interface 150. The comparator can perform logical as well as arithmetic comparisons with the following possible results: the data sample from analog interface 150 is greater than the data from MVT 70, the data sample from analog interface 150 is less than the data from MVT, or the data sample from analog interface 150 is equal to the data from MVT 70. These outputs are mutually exclusive and are inputted into the logic of membership value confirmation/disconfirmation logic 120 for conforming or disconfirming the digitized sample from analog interface 150.

Membership value confirmation/disconfirmation logic 120 uses the results from digital comparator 100 to determine if the digitized sample from a sensor channel is within the domain of the function for that channel. If so, then membership value confirmation/disconfirmation logic 120 sends a confirmation signal which is used to generate a latching signal to data/parameter interface logic 30. This latching signal latches the current address generated by membership value/line switcher logic 50 representing the current membership value for that digitized sample.

Still referring to FIG. 1, the logic in membership value confirmation/disconfirmation logic 120 is divided into three sections for S-, Z-, and PI-function evaluations. For Z-functions, the "data sample from analog interface 150 is less than data value from MVT 70" and "data from analog interface 150 is equal to data value from MVT 70" outputs from digital comparator 100 are logically "or'ed" together. The output from this logical "or'ing" is then logically "and'ed" with the Z-function bit from data/parameter interface logic 30. The Z-bit, in this case, enables the Z-function evaluation circuitry portion of membership value confirmation/disconfirmation logic 120 when the Z-bit is asserted. Initially, Z-functions require that the data sample for analog interface 150 must be less than or equal to the initial membership threshold value in order for the conversion to proceed. The threshold value is the first data value from MVT 70 that is evaluated against the data sample from analog interface 150. This evaluation establishes whether the sample is within the domain of the channel's knowledge-data. If it is, the conversion continues comparing subsequent data values from the channel's memory block MVT 70 against the data values from analog interface 150. Each time the condition "data sample from analog interface 150 less than or equal to data value from MVT 70" is met, membership value confirmation/disconfirmation logic 120 sends a latching signal to data/parameter interface logic 30 to latch the current membership value represented by the address from membership value/line switcher logic 50. When the condition is no longer met, that is, data sample from analog interface 150 must be less than or equal to the data from MVT 70, the conversion stops. This leaves the most recent address value from membership value/line switcher logic 50 latched in data/parameter interface logic 30, representing the membership value of the data sample.

Similarly, for S-function membership value conversions, the "data sample from analog interface 150 greater than data from MVT 70" and "data sample from analog interface 150 equals data from MVT 70" outputs from digital comparator 100 are logically "or'ed" together. The output from this "or'ing" is logically "and'ed" with the S-function bit from data/parameter interface logic 30. When the S-function bit is asserted, the S-function evaluation circuitry portion of membership value confirmation/disconfirmation logic 120 is enabled. Initially, S-functions require that the data sample from analog interface 150 be "greater than or equal to" the initial membership threshold value stored in MVT 70 for the sensor channel selected for the conversion to proceed. Like Z-function operations, this is the first value from MVT 70 that is evaluated against the data sample from analog interface 150. If the data sample is within this domain, the conversion continues comparing subsequent data values from MVT 70 that is evaluated against the data sample from analog interface 150. The threshold value is the first value from MVT 70 that is evaluated against the data from analog interface 150 and its purpose is the same as for the Z-function. When the condition is no longer met, that is, data sample from analog interface 150 must be "greater than or equal to the data value from MVT 70, the conversion stops. This leaves the most recent address value generated from membership value/line switcher logic 50 latched in data/parameter interface logic 30, representing the membership value of the data sample.

The PI-function section is enabled only when the PI-bit from data/parameter interface logic 30 is asserted. The PI-bit also enables the lower buffer in membership value/line switcher logic 50 for PI-function operations. The logic consists of a combination of the Z- and S-function sections as hereinbefore described in detail. The output from these two sections are logically "or'ed" together and then the output of this or'ing logically "and'ed" with the PI-bit. This approach handles the upper and lower membership value thresholds and data as required for the function. The Z-function section handles the upper half and the S-function section handles the lower half of the PI-function.

When the PI-function conversion starts, the first two values outputted from MVT 70 are the initial upper and lower membership threshold values (membership of 0), with the upper value evaluated first. These are the two data points located on the ends of the function curve. If the data sample from analog interface 150 is within the two samples, that is, "data sample greater than or equal to lower membership value threshold" or "data sample less than or equal to upper membership value threshold" the next two values, upper and lower are compared (next membership value). The comparison continues until the membership value is determined or the last value flag is detected just like Z- and S-functions.

It should be apparent to those skilled in the art that for PI-functions it takes two addresses from membership value/line switcher logic 50 for each membership value evaluation. For example, for membership value 0, two addresses therefrom are generated, 00 Hex (00H) and 01 Hex 0IH). But, since the $A_0$ bit from the counter in membership value/line switcher logic 50 is now the most significant bit (MSB) input to MVT 70 as hereinbefore explained in the membership value/line switcher logic section, address 00 Hex ($A_0=0$, MSB) causes the upper membership value threshold that resides in the first address in the lower memory half of the memory block to be outputted from the MVT. The next sequential address 01H ($A_0=1$, MSB) causes the lower membership value threshold that resides in the first address in the upper memory half to outputted. Address 0IH from membership value/line switcher logic 50 becomes 01H going into MVT 70 since $A_0$ is now the MSB.

The fuzzy cell control logic 170 provides overall cell control and computer access control. This section contains the logic that includes: computer access to MVT 70 for reconfiguration thereof; enable/disable the appropriate buffer in membership value/line switcher logic 50 for S-, Z-, or PI-functions; control for selecting a sensor channel in membership value/line switcher logic 50; the cell clocks for the cell state machine for the analog-to-grade of membership conversion; the cell state machine used for controlling the conversion process; and the interrupt flag to the computer when a conversion is complete. The logic contains a synchronizing section including a synchronizing clock that synchronizes the conformation/disconfirmation decision from membership value confirmation/disconfirmation logic 120 with the instant cell's timing clocks. The cell control logic also includes a synchronizer that synchronizes the A/D conversion completion with the cell system clocks.

The section also includes the inhibit function used when the learn or reconfiguring mode occurs. An inhibit signal sent from the computer interface 10 will inhibit the analog to grade-of-membership conversion operation. Therefore, when a sample request signal is sent to the instant cell and the A/D conversion is complete, the sample ready signal will not start the cell in converting the sampled sensor data into its membership value. Rather, in accordance with the present invention, the cell's conversion circuitry stays inhibited, allowing the computer to obtain the digitized data sample at the appropriate sampling rate for raw data acquisition. When the computer has finished the learn mode, it issues an enable signal from bus interface logic 10 to MVT 70, clearing the inhibit function. When the instant cell is not converting a digitized sample for a sensor channel, the computer's address, control, and data lines to MVT 70 are active, allowing the computer access to the contents thereof. When the instant cell is performing an analog to grade-of-membership conversion, control logic 170 outputs control signals to disable computer access to MVT 70. However, in accordance with the present invention, the computer can still send an override signal that inhibits the cell if required.

As should be evident to those skilled in the art, the signal conditioned sensor data 140 contains sensors and appropriate signal conditioners for measuring physical parameters such as pressure, temperature, vibration, acceleration. These are standard single-ended or differential signals.

Analog interface 150 performs the scaling function of selected sensor channel signal and the digitization of the scaled signal. In addition, it selects the appropriate sensor channel and the appropriate scaling for that channel by receiving channel and gain control bits from data/parameter interface logic 30. These bits are then loaded into the analog interface by the computer by sending a control signal from control logic 170. The digitization of the selected sensor channel occurs when the computer sends a sample request signal from bus interface logic 10. The A/D conversion is performed which then notifies the computer and the instant cell that the A/D is complete by outputting an end of conversion signal or sample ready signal. Simultaneously, the raw digitized data sample is outputted to digital comparator 100 and latched in data/parameter interface logic 30 using the sample ready signal. The sample ready signal is also sent to bus interface logic 10 to notify the computer either as a polling or as an interrupt signal. It is an advantage of the present invention that this alternate way of notifying the computer is used in the learn mode when the interrupt signal ordinarily used for analog to grade-of-membership conversion is disabled. Since sampling of each sensor channel can vary, the design allows for different channel sampling rate as long as the overall bandwidth is maintained.

Bus Interface Logic 10 provides the interface between the computer and the instant cell. Command signals for reading the raw digitized sample and/or membership value, loading fuzzy cell data parameters, reading/writing from/to MVT 70, loading channel and gain selection, and inhibiting/enabling the cell operation are performed through this interface. In accordance with the present invention, the computer has directed access to data/parameter interface logic 30 for loading in fuzzy cell data parameters, reading the raw digitized data sample, and reading the membership value. Controls for these functions are provided by the computer through this interface. The computer has non-blocking access to perform these functions any time. The computer's control signals from bus interface logic 10 has access to MVT 70 through the arbitration circuitry in control logic 170. This occurs when the computer is reconfiguring MVT 70. The computer loads new knowledge-data about a particular sensor channel used in membership value determination of the raw digitized data sample from analog interface 150. Additional signals from bus interface logic 10 also include loading in the channel select bits from data/- parameter interface logic 30 into analog interface 150 and sending the sample request signal to 150 to start the conversion. Interface 10 also allows the sample ready signal and the interrupt flag from the instant cell to be received by the computer.

Still referring to FIG. 1, last value detect logic 200 is a programmable combinational logic design used in detecting the last value flag coming from MVT 70. The last value flag is used to terminate the analog to grade-of-membership conversion for that channel. When this unique data byte is detected by 200, an output signal is sent to control logic 170 for sending an interrupt to the computer. This event occurs when the membership value reaches 1.0 for the digitized data sample from analog interface 150. In accordance with the present invention, the design of last value detect logic 200 allows the last value flag to be placed anywhere in the channel's section of memory. Consequently, different numbers of membership values can be assigned based on memory availability. For example, if this flag is placed in the twenty first address location in a given sensor's channel section of memory in MVT 70, there will be 20 membership values (increments of 0.05 up to 1.0) associated with that sensor channel.

The data byte or word programmed into the instant device for detecting the last value flag is one that analog interface 150 will not produce. For example, most sensor channels are scaled such that for full-scale the A/D will produce 250 PCM counts (FAH). Therefore, the last value flag would be programmed in as 254 (FEH) or 255 (FFH) PCM counts. It is a feature and advantage of the present invention that this way the knowledge-data in MVT 70 does not contain the last value flag causing the conversion to end prematurely.

Figure 2:
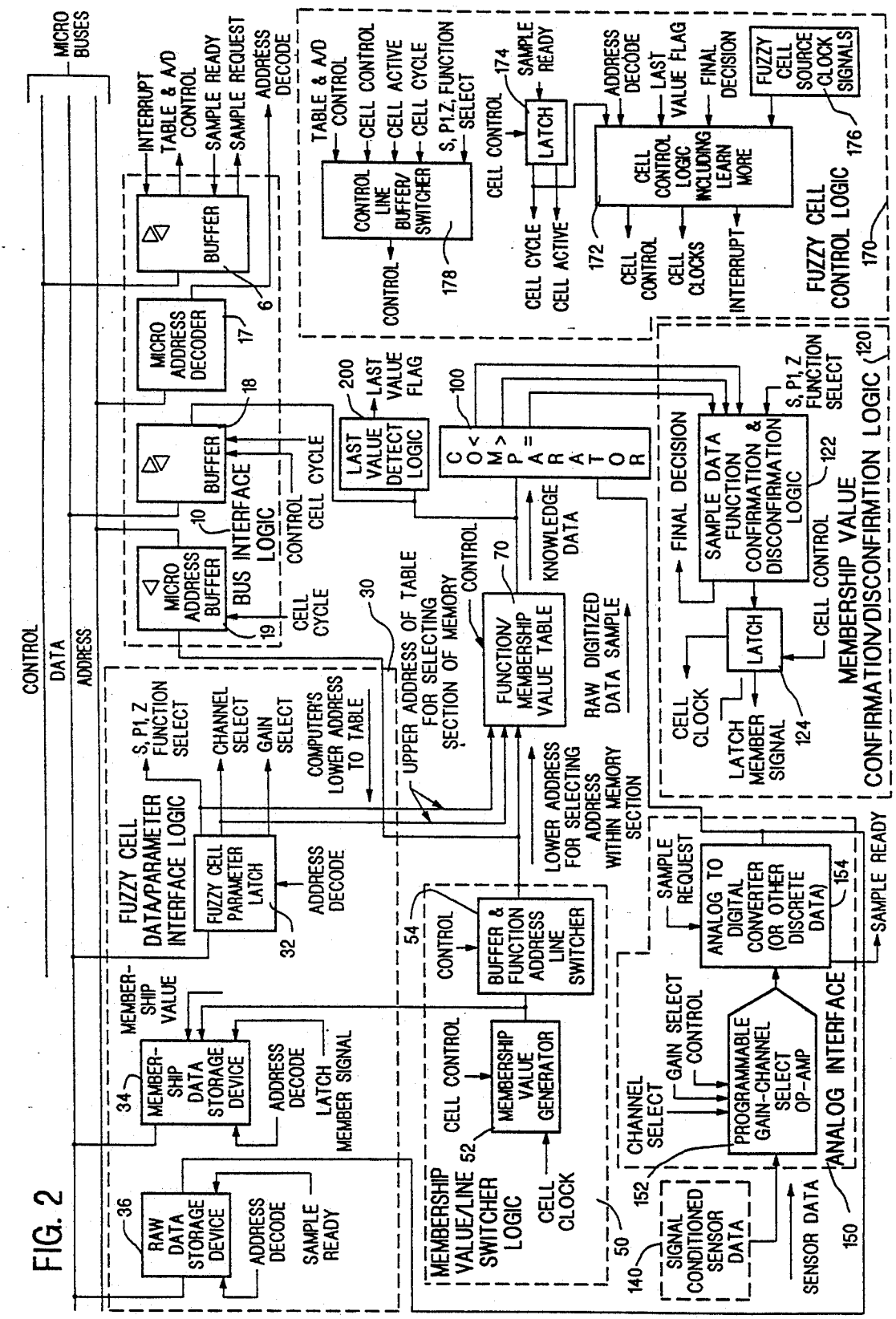
FIG. 2 is a detailed block diagram depicting the hardware components of the preferred embodiment of an in situ reconfigurable fuzzy cell in accordance with the present invention.

FIG. 2 depicts how the preferred embodiment of the present invention is implemented in hardware. Referring now to FIGS. 1 and 2, fuzzy cell data/parameter interface logic block 30 consists of raw data storage device 36, membership data storage device 34, and fuzzy cell parameter latch 32. Bus interface logic block 10 which interfaces a computer with the instant cell consists of micro address buffer 19 and related data buffer 18, and micro address decoder 17 and related buffer 6. Membership value/line switcher logic block 50 consists of membership value generator 52 and buffer and address line switcher 54. Analog interface block 150 consists of programmable gainselect op-amplifier 152 and analog-to-digital converter 154. Signal conditioned sensor data 140 consists of the sensors and signal conditioning circuitry. Membership value confirmation/disconfirmation logic block 120, consists of latch 124 and sample data function confirmation and disconfirmation logic 122. Fuzzy cell control logic block 170 consists of cell control logic including learn mode 172, latch 174, control line buffer/switcher 178, and fuzzy cell source clock signals 176.

FIGS. 4 A-B are block diagrams depicting the functional flow of the analog-to-membership value conversion mode embodying the present invention. Referring now to FIGS. 2 and 4 A-B, the operation of the analog-to-membership value conversion may be understood by tracing the flow depicted in FIGS. 4 A-B. In particular, the computer loads channel select, gain select, and function select parameters into fuzzy cell parameter latch 32. This establishes the gain and selects the multiplex analog signal channel to sample by latching them into programmable gain/channel select op-amplifier 152 of analog interface 150, using control signal from 17 of 10 into control line buffer/switcher 178.

In accordance with the present invention, and now referring to FIGS. 2, 3 B and 4 A-B, the function and channel bits from 32 are applied to the upper half address bits ($A_6$, $A_7$, $A_8$, $A_9$, $A_{10}$ and $A_{11}$) of membership value table 70. As shown in Tables I-III, depicting a typical memory map of function or membership value in accordance with the present invention, this ascertains locations (memory blocks) in memory where the "knowledge-data" is stored corresponding to the particular channel selected.

TABLE I

Z-FUNCTION
TYPICAL MEMORY MAP OF FUNCTION/MEMBERSHIP VALUE TABLE

| CHANNEL SELECT | | | FUNCTION SELECT | | | GRADE-OF-MEMBERSHIP (ADDRESS SPACE) | | | | | | |
|---|---|---|---|---|---|---|---|---|---|---|---|---|
| | | | PI(H) | S(H) | Z(H) | | | | | | | |
| $CS_3$ | $CS_2$ | $CS_1$ | $FS_3$ | $FS_2$ | $FS_1$ | $A_5$ | $A_4$ | $A_3$ | $A_2$ | $A_1$ | $A_0$ | CONTENTS |
| 0 | 0 | 0 | 0 | 0 | 1 | 0 | 0 | 0 | 0 | 0 | 0 | MTV |
| ↓ | ↓ | ↓ | ↓ | ↓ | ↓ | ↓ | ↓ | ↓ | ↓ | ↓ | ↓ | ↓ |
| 0 | 0 | 0 | 0 | 0 | 1 | 1 | 1 | 1 | 1 | 1 | 1 | END FLAG |

TABLE II

S-FUNCTION
TYPICAL MEMORY MAP OF FUNCTION/MEMBERSHIP VALUE TABLE

| CHANNEL SELECT | | | FUNCTION SELECT | | | GRADE-OF-MEMBERSHIP (ADDRESS SPACE) | | | | | | |
|---|---|---|---|---|---|---|---|---|---|---|---|---|
| $CS_3$ | $CS_2$ | $CS_1$ | $FS_3$ | $FS_2$ | $FS_1$ | $A_5$ | $A_4$ | $A_3$ | $A_2$ | $A_1$ | $A_0$ | CONTENTS |
| 0 | 0 | 1 | 0 | 1 | 0 | 0 | 0 | 0 | 0 | 0 | 0 | MTV |
| ↓ | ↓ | ↓ | ↓ | ↓ | ↓ | ↓ | ↓ | ↓ | ↓ | ↓ | ↓ | ↓ |
| 0 | 0 | 1 | 0 | 1 | 0 | 1 | 1 | 1 | 1 | 1 | 1 | END FLAG |

TABLE III

PI-FUNCTION
TYPICAL MEMORY MAP OF FUNCTION/MEMBERSHIP VALUE TABLE

| CHANNEL SELECT | | | FUNCTION SELECT | | | GRADE-OF-MEMBERSHIP (ADDRESS SPACE) | | | | | | | CONTENTS |
|---|---|---|---|---|---|---|---|---|---|---|---|---|---|
| CS₃ | CS₂ | CS₁ | FS₃ | FS₂ | FS₁ | A₀ | A₅ | A₄ | A₃ | A₂ | A₁ | | |
| | | | | | | | \multicolumn{5}{c}{Grade of Membership} | | | |
| 0 | 0 | 0 | 0 | 0 | 1 | 0 | 0 | 0 | 0 | 0 | 0 | | MTV |
| ↓ | ↓ | ↓ | ↓ | ↓ | ↓ | ↓ | ↓ | ↓ | ↓ | ↓ | ↓ | | |
| | | | | | | | 1 | 1 | 1 | 1 | 0 | | LDV (Lower) |
| 0 | 1 | 0 | 1 | 0 | 0 | 0 | 1 | 1 | 1 | 1 | 1 | | END FLAG |
| | | | | | | 1 | 0 | 0 | 0 | 0 | 0 | | MTV (Upper) |
| ↓ | ↓ | ↓ | ↓ | ↓ | ↓ | ↓ | ↓ | ↓ | ↓ | ↓ | ↓ | | |
| 0 | 0 | 0 | 0 | 0 | 1 | 1 | 1 | 1 | 1 | 1 | 1 | | LDV (Upper) |

Thus, the PI bit of the function select is also applied to control line buffer/switcher 178 to select the appropriate buffer and function address line switcher 54 which consists of two buffers, upper and lower. The upper buffer is for Z- and S-function operations, and the lower buffer is for PI-function operations. Referring to Tables I and II, for S- and Z-functions, the upper buffer is enabled. This allows the address obtained from membership value generator 52 to proceed to the address input of 70 unaltered. On the other hand, for PI functions, as shown in Table III, the lower buffer switches the address lines from $A_5, A_4, A_3, A_2, A_1, A_0$ to $A_0, A_5, A_4, A_3, A_2, A_1$ into membership value table 70. Since $A_0$ is now the most significant bit, addresses from membership value generator 52 result in switching between the upper and lower portion of the memory block in an alternating fashion wherein the upper memory space has the lower membership value threshold and left half of the function data, and the lower memory space has the upper membership value threshold and right half of the function data. In addition, the mutually exclusive function select bits S, Z, and PI, also enable the appropriate decision circuit in 122.

Figure 11:
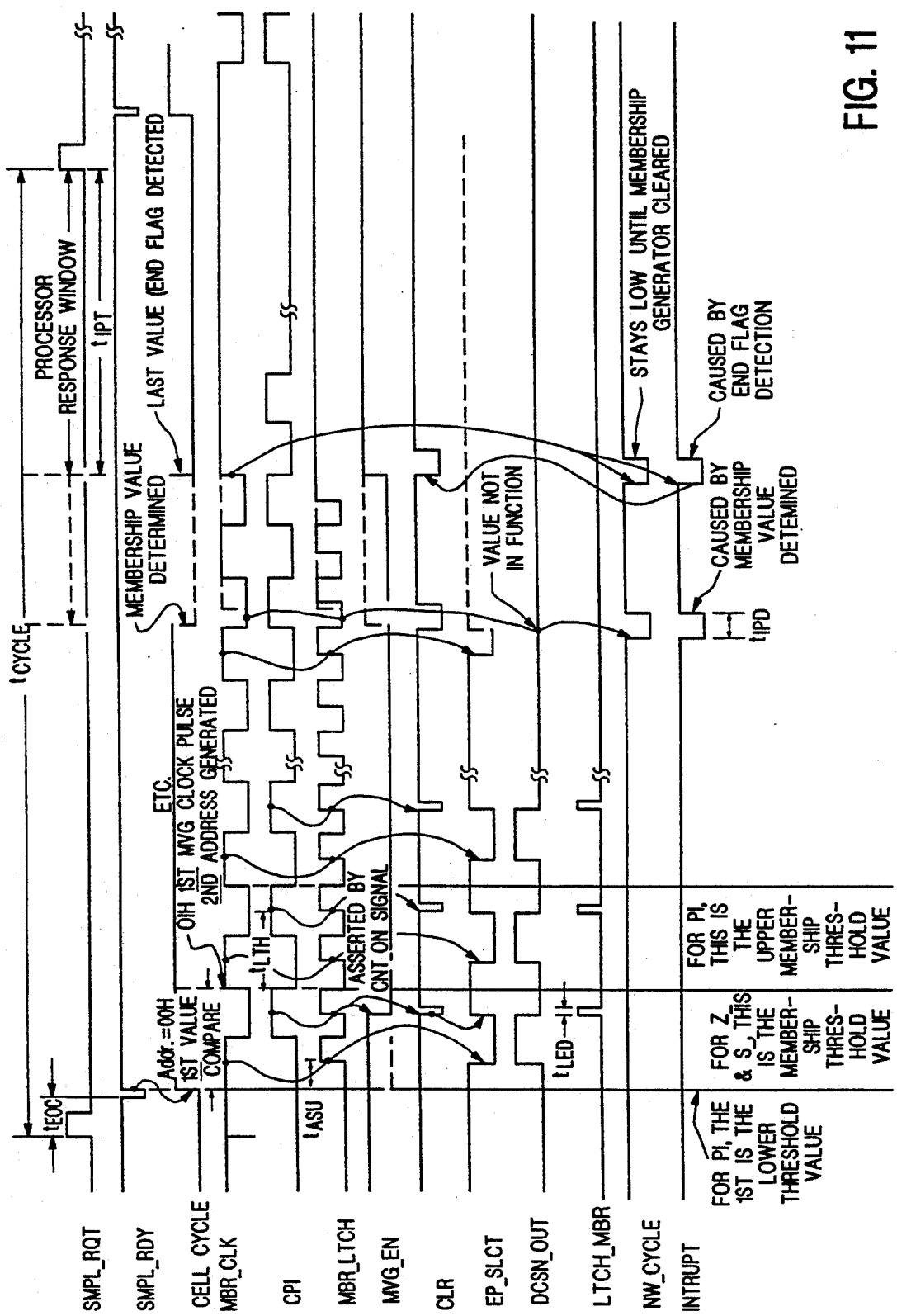
FIG. 11 depicts a typical timing diagram in accordance with the present invention.

Referring to FIGS. 2 and 4 A-B, the computer next issues a sample request pulse from buffer 6 of bus interface logic circuit 10 to start the cycle of the reconfigurable fuzzy cell, in accordance with the present invention. FIG. 11 is a typical timing diagram which illustrates the chronological relationship between the various signals generated and used by the reconfigurable fuzzy cell. As depicted therein, time $t_{CYCLE}$ represents the time conversion between samples. In the extreme left column therein, this sample request signal, identified as "SMPL_RQT" is clearly seen as starting the cell cycle.

This pulse is then applied to ADC 154 of analog interface circuit 150, which converts the analog signal from the selected analog sensor channel 140 into its corresponding binary representation. When this analog-to-digital conversion is complete, $t_{EOC}$ representing the analog-to-digital conversion time in FIG. 11, ADC 154 produces a "sample-ready" signal, which is identified as "SMPL_RDY." This sample-ready signal latches the raw digitized sample into raw data storage device 36 of fuzzy cell data/parameter interface logic circuit 30. This, in turn, activates control line buffer/switcher 178 of fuzzy cell control logic circuit 170 for cell operation, inhibits computer control access to 70, and concomitantly activates cell control logic 172 by enabling latch 174, resulting from the "SMPL_RDY" signal as shown in FIG. 11. As also shown therein, $t_{ASU}$ represents the address setup time before function/membership table 70 is enabled.

Figure 3A:
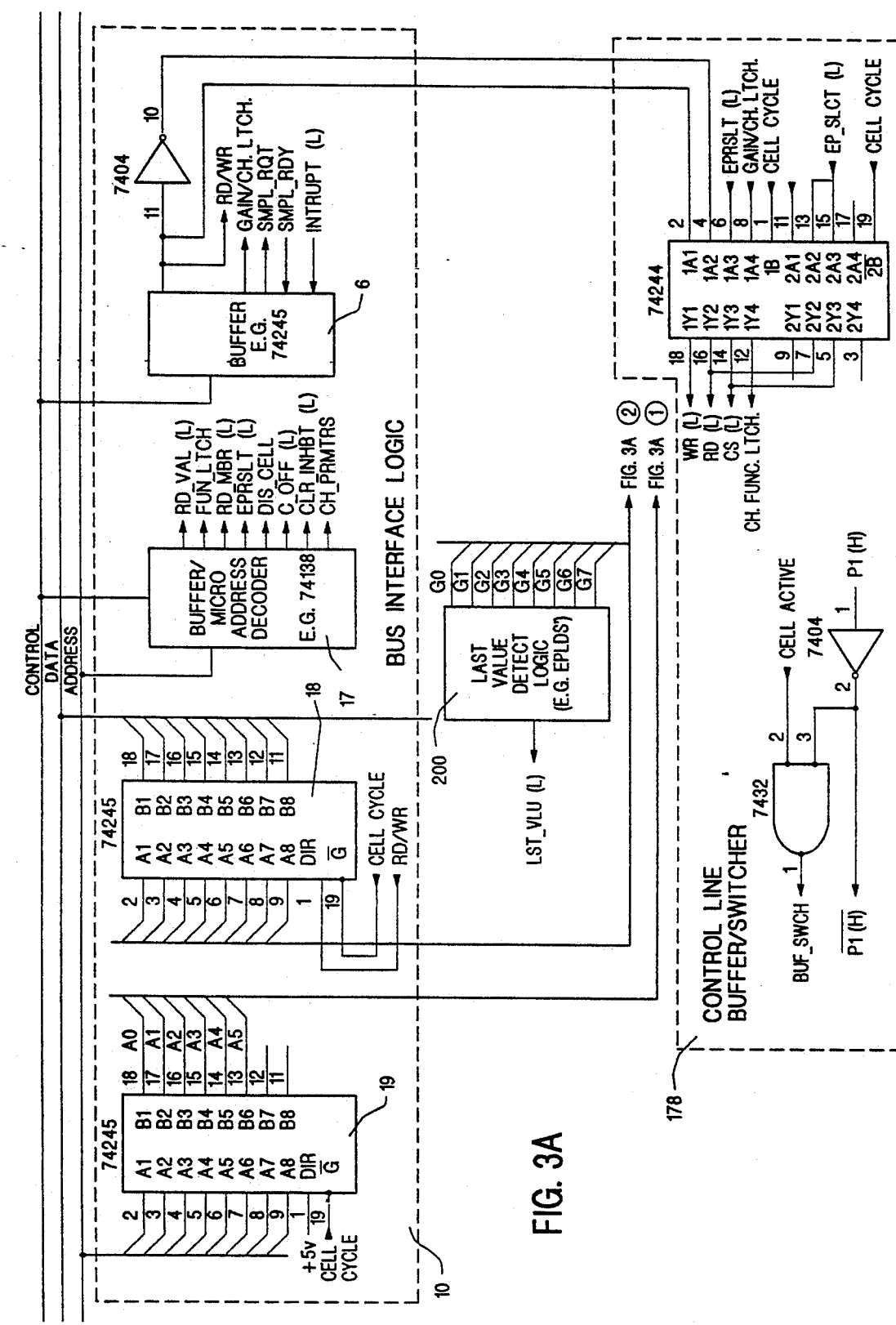
FIG. 3A is a simplified schematic diagram depicting bus interface logic circuitry embodying the present invention.
Figure 3B:
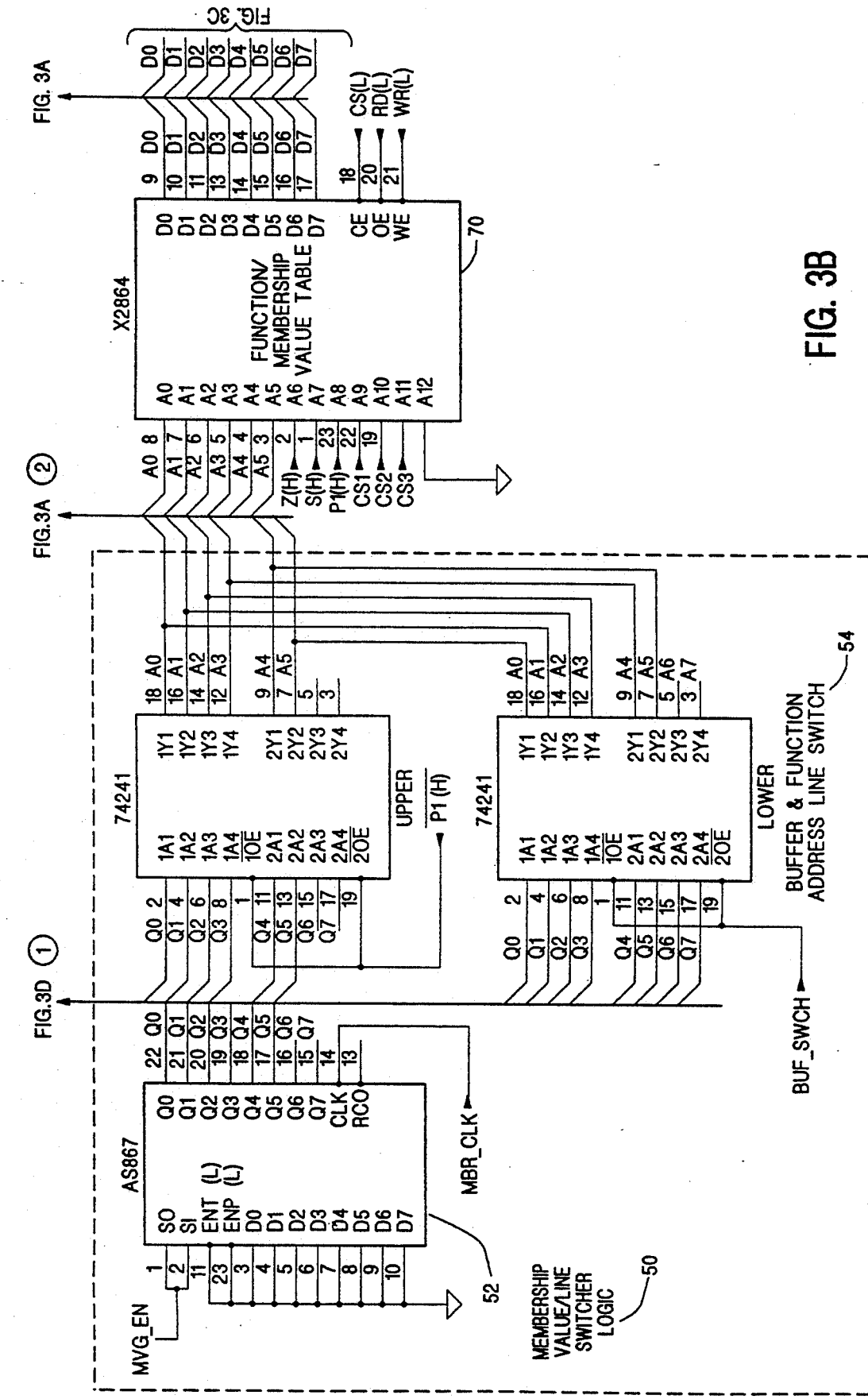
FIG. 3B is a simplified schematic diagram depicting membership value/line switcher logic circuitry embodying the present invention.
Figure 3D:
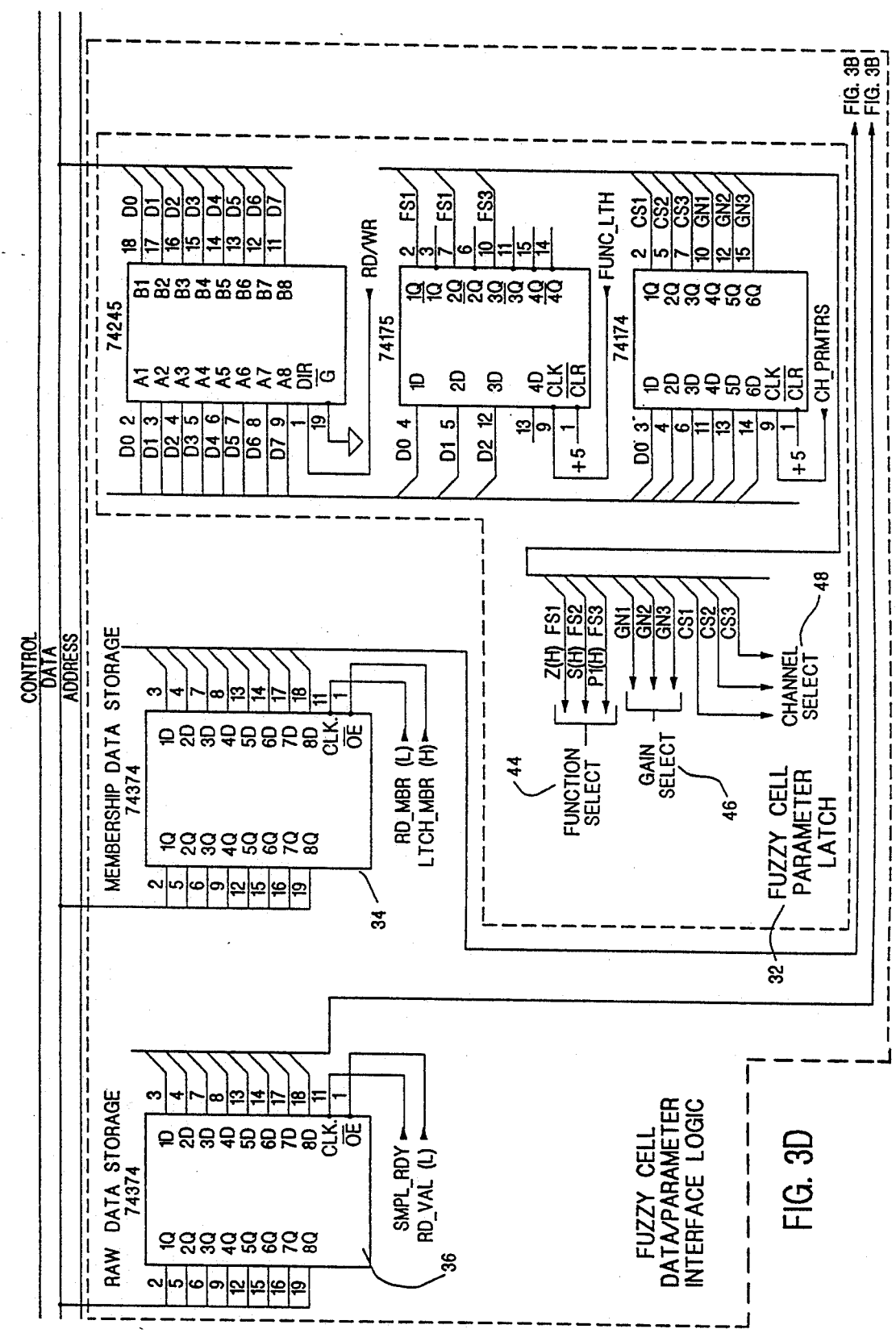
FIG. 3D is a simplified schematic diagram depicting fuzzy cell data/parameter interface logic circuitry embodying the present invention.
Figure 3E:
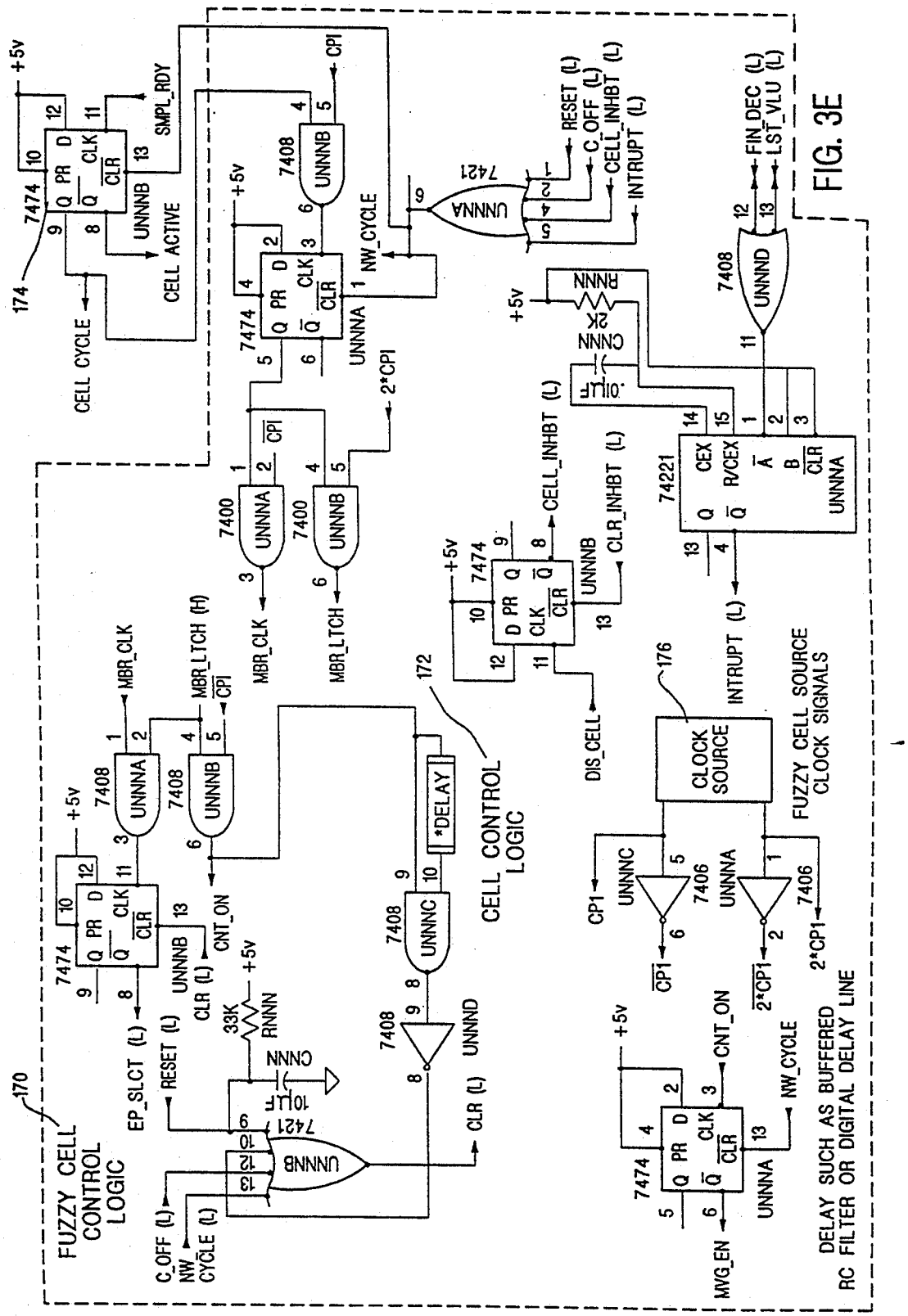
FIG. 3E is a simplified schematic diagram depicting fuzzy cell control logic circuitry embodying the present invention.

As shown in FIGS. 2 and 3E, latch 174 has two signals, "cell cycle" (identified as CELL_CYCLE in FIG. 11) and "cell active", which are used contemporaneously to enable the appropriate buffers and control signals. In accordance with the present invention, during the analog-to-membership conversions, the cell cycle signal disables buffer and control line access from the computer via 10 to membership value table 70. On the other hand, the cell active signal enables the cell buffers and controls, to access membership value table 70 during an analog to grade-of-membership conversion. As will become clear to those skilled in the art, the cell cycle latch signal also enables membership value generator 52 whereby it may be incremented by the cell clocks from 172 which were additionally enabled by the hereinbefore described sample ready signal.

In accordance with the present invention, the digitized sample is compared against the contents of the selected sensor channel's memory block in the membership value table 70, i.e., "knowledge-data," using comparator 100. The three outputs of comparator 100, corresponding to less than, equal to, or greater than conditions, are communicated to sample data function confirmation/disconfirmation logic circuit 120. The cell clocks emanating from cell control logic circuit 172 activate latch 124. As will become clear to those skilled in the art, cell control logic circuit 172 controls the sequence of events using fuzzy cell source clock 176 as the system clocks. Latch 124 of membership value confirmation/disconfirmation logic circuit 120 latches the appropriate membership value of the signal representation generated by membership value generator 52 into membership data storage device 34, if the sample was within the particular function selected. This, of course, is determined by 122 of 120. The decision out signal indicates if the sample from 154 is within the domain of the function. If the sample is within the domain of the function, then the latch membership signal is generated which, in turn, latches the current address from 52 into 34. On the other hand, if the sample is not within the domain of the function, then the decision out signal causes an interrupt to the computer indicating that the conversion has terminated.

Figure 4A:
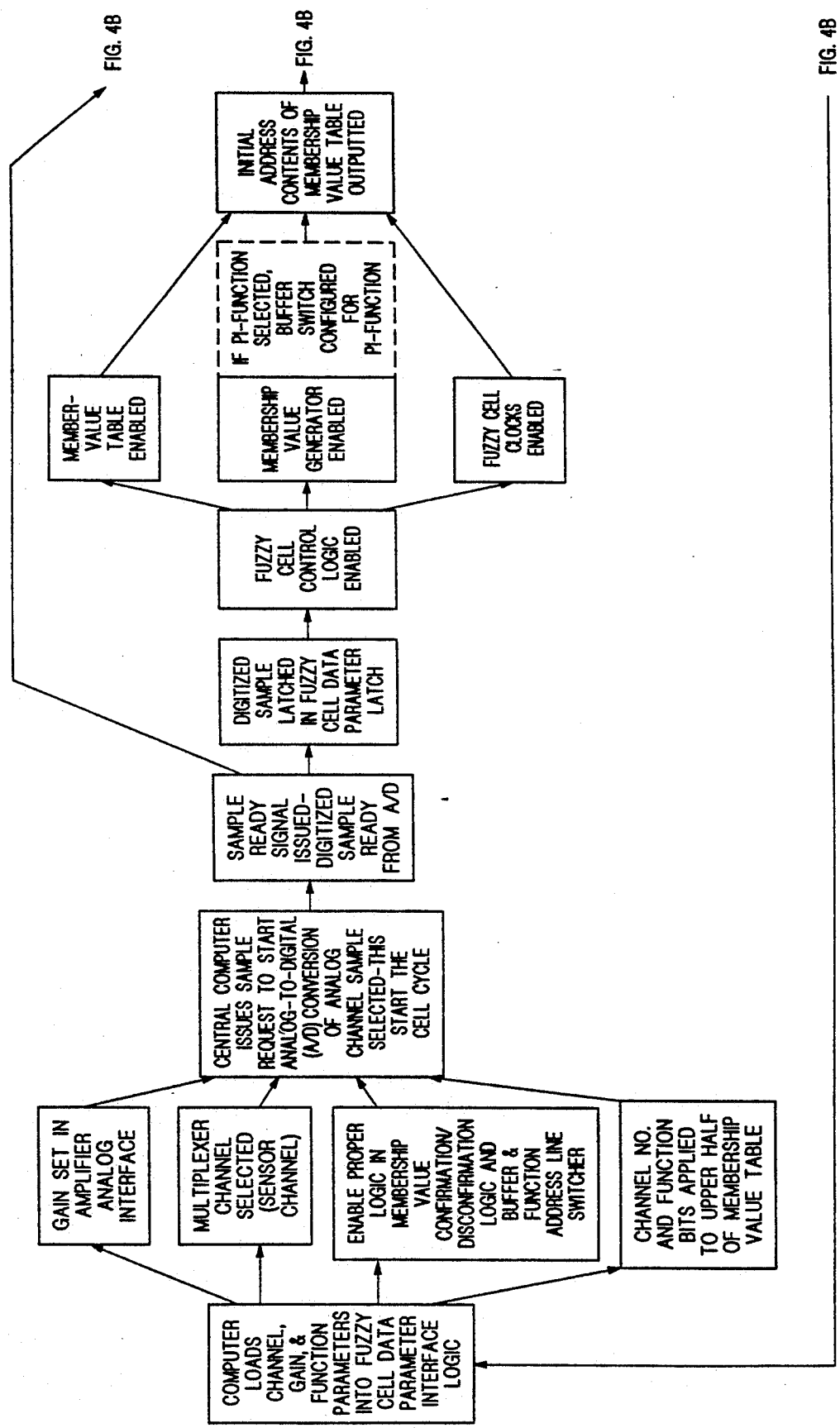
FIG. 4A is a portion of a block diagram depicting the functional flow of the analog-to-membership value conversion mode embodying the present invention.
Figure 4B:
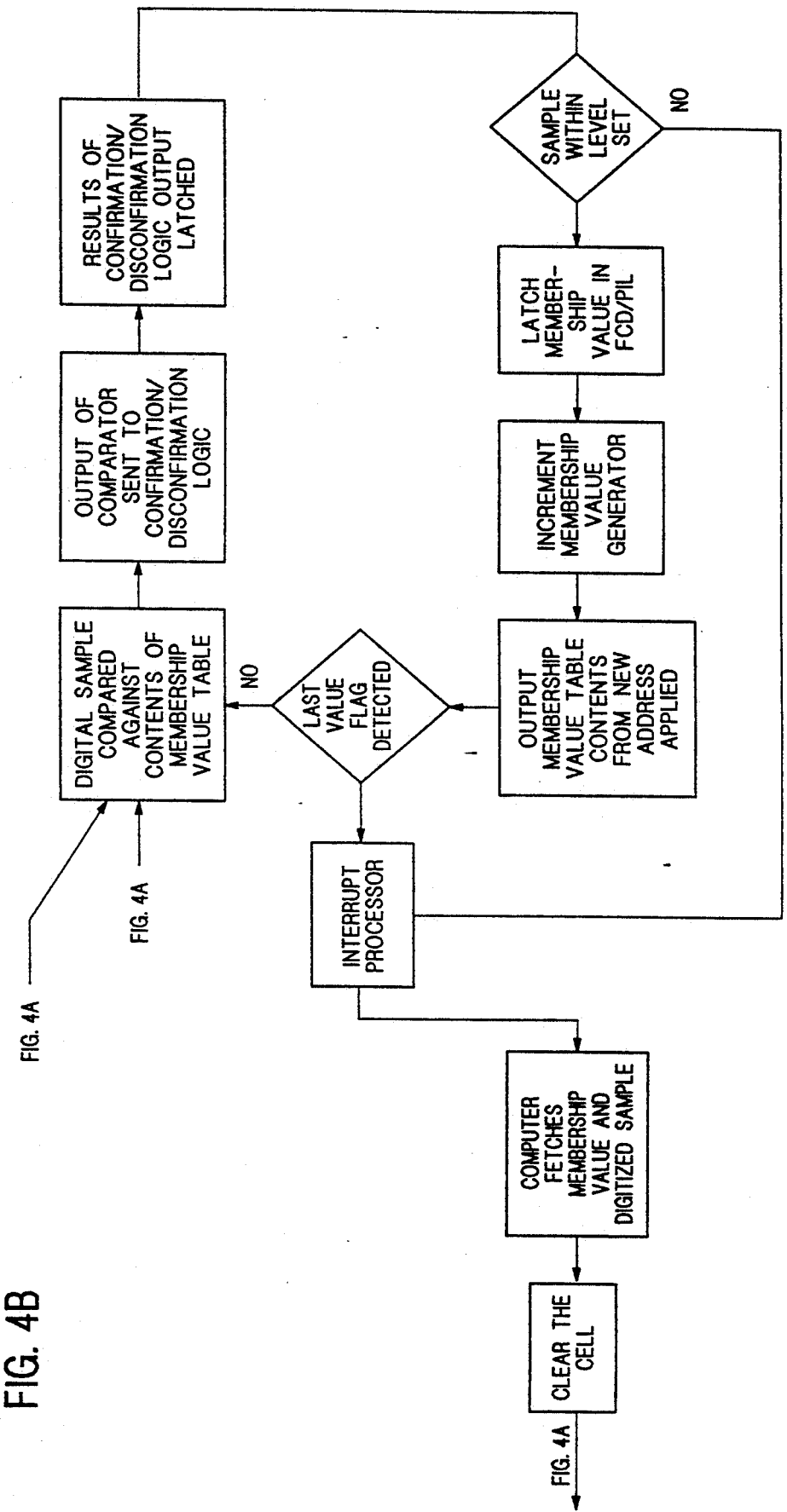
FIG. 4B is the remaining portion of the block diagram depicted in FIG. 4A.
Figure 5:
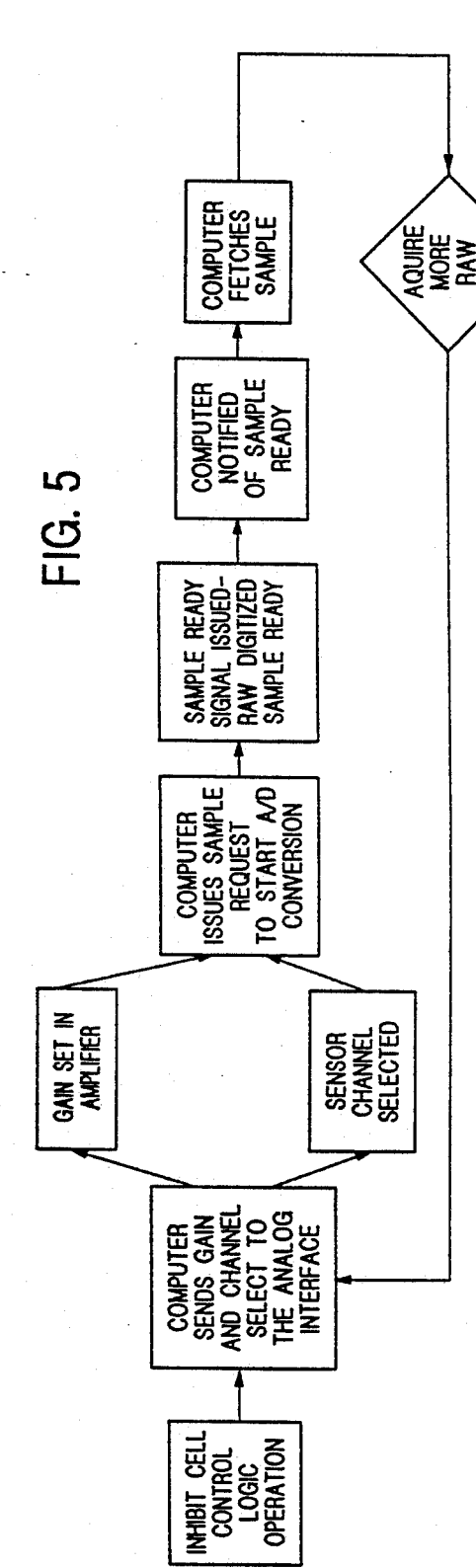
FIG. 5 is a block diagram depicting the functional flow of the learn mode embodying the present invention.

Similar to FIGS. 4A-B, FIG. 5 is a block diagram depicting the functional flow of the learn mode embodying the present invention. Now referring to FIGS. 2 and 5, in accordance with the preferred embodiment of the present invention, the cell control operation as hereinbefore described is inhibited in cell control logic block 172. This is accomplished by sending an inhibit signal, i.e., "DIS_CELL" (FIG. 3E), from 17 to 172. The computer then sends gain and channel no. select information to programmable gain-channel select op-amplifier 152 of analog interface 150. This information is loaded by a computer control signal received from 178. As should be apparent to those skilled in the art, the indicated gain is then set in op-amplifier 152 and the indicated channel is selected. The computer then issues a sample request from 6 of 10 which is received by ADC 154, to start the analog-to-digital conversion. Again, as shown in FIG. 11, it takes $t_{EOC}$ to complete the analog-to-digital conversion. Next, ADC 154 issues a sample ready signal which latches the digitized sample into the raw data storage device 36, and this sample-ready condition is relayed to the computer. The computer then fetches the sample from 36 using control signals from 17 and 6 of bus interface logic block 10. It is clearly seen in FIG. 2 that buffer 6 receives the sample-ready signal and transmits the sample-request signal.

Figure 6:
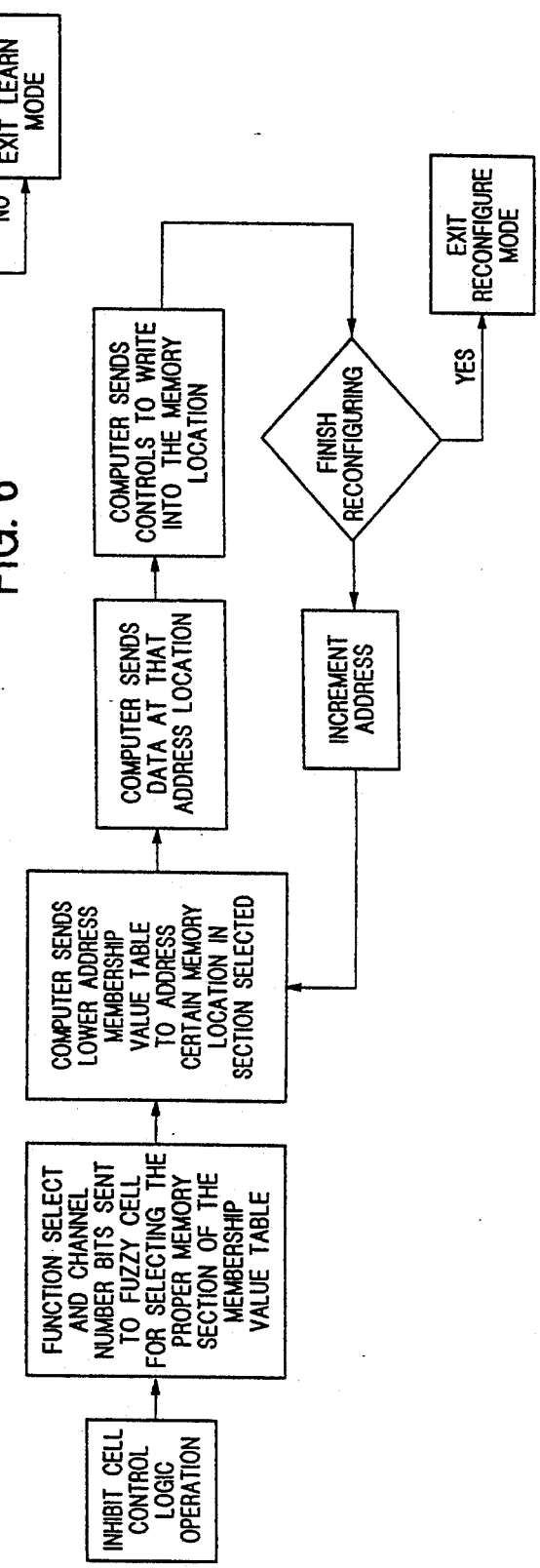
FIG. 6 is a block diagram depicting the functional flow of the mode reconfiguring the cell's membership value table embodying the present invention.

FIG. 6 is a block diagram depicting the functional flow of the mode reconfiguring the cell's membership value table embodying the present invention. Referring now to FIGS. 2 and 6, similar to the learn mode, the reconfiguration mode is initiated by inhibiting the control logic operation in cell control logic block 172. The function select and channel no. bits are then transmitted to 32 which, in turn, selects the proper memory section of membership value table 70. The gain bits are "don't care" in this mode. The computer then transmits the lower address to the membership value table via 19 of 10 to address a particular memory location in the selected section. Next, the computer transmits data from 18 of 10 to 70 at this address location, and then transmits control signals from 17 and 6 through 178 and on to 70 to write into the memory location. The computer may then read back this written information to verify the new data using the same elements from 10.

Referring now to FIGS. 3 A-E there are seen simplified schematic diagrams depicting the circuity corresponding to the hardware components of the preferred embodiment shown in the blocks depicted in FIGS. 2. Thus, the reconfigurable fuzzy cell is shown therein providing conversions of up to 8 channels of signal-conditioned sensor data. Activation of the cell begins when the first sample request pulse (shown in FIG. 3C as SMPL-RQT in analog interface circuit 150) is received from 6 of bus interface logic 10 thereby commencing conversion of the selected external input sensor channel from signal conditioned sensor data 140. This signal is applied to the digital control PGMA 152. Prior to each such pulse arrival, fuzzy cell parameter latch 32 (in FIG. 3D) is loaded with the selected channel's function select 44, identified as FS1, FS2 and FS3; gain select 46, identified as GN1, GN2 and GN3; and channel select 48, identified as CS1, CS2 and CS3, parameter bits by a central fuzzy controller or processor 170 for raw sensor channel data-to-membership value conversion. Function select bits 44 and channel select bits 46, which are used to select the proper sensor data channel of PGMA 152, also provide selection of the appropriate memory area of function/membership value table 70, i.e., of the EEPROM, containing the "knowledge" or level-set data for that channel. In addition, FS3 enables the appropriate buffer in 54, depending from whether it is a S-, Z-, or PI-conversion.

As will become clear to those skilled in the art, function select bits 44 enable either the Z-, S- or PI-compare circuitry of sample data function confirmation/disconfirmation logic circuitry 122 to deduce the grade of membership of a select data channel sample. Gain select bits 46 are used to select one of the 8 possible PGMA gains available for correctly scaling the signal-conditioned sensor data 140 before it is applied to ADC 154.

When any one of mutually exclusive function select lines Z(H), S(H) or PI(H), corresponding to function select bits 44, are asserted and the digitized data sample is within the selected membership function for each EEPROM level-set data value, the membership value represented by the output of membership value generator (8-bit counter) 52, for each selected channel EEPROM address value, is latched using membership latching signal LTCH_MBR(H) exiting from latch 124 of membership value confirmation/disconfirmation circuit 120. The membership latching signal is generated if the DCSN_OUT signal is asserted, indicating that the digitized sample from 154 is within the domain of the knowledge-data. When the sample is not defined or no longer defined within the membership function, 122 output a flag indicated by signal FIN_DEC(L), or when the channel function end flag located in 70, indicated by signal LST_VLU(L), is detected thereby marking the end of the block for the function of that channel, cell control logic circuitry 170 terminates operation of the cell, leaving the most recent membership value latched for processor retrieval. Cell control logic circuitry 172 then issues interrupt signal INTRUPT(L) to the computer, clears all latches, and becomes inhibited until the next sample request pulse event occurs. Cell element 170 contains synchronizing circuitry to synchronize the results of 122 and the A/D conversion completion with the instant cell's system clocks.

In accordance with the present invention, subsequently, the main processor fetches the determined digitized data sample's membership value and/or the digitized raw data sample, latched by ADC 154 sample ready signal SMPL_RDY, loads the next new fuzzy cell channel parameters, issues the sample request signal SMPL_RQT signal again to ADC 154, and begins the process again.

Depending upon which function is selected, the buffer & function address line switch 54 of the membership value/line switcher logic circuitry 50 either allows incrementing the address of the EEPROM sequentially for Z- and S-functions, i.e., PI(H) function bit not asserted, or in an alternating manner from lower to upper for PI-functions, i.e., PI(H) function bit asserted, accomplished by relating the $A_0$ address line to the $A_5$ address line of the EEPROM. The address line 5 into 70 are therefore switched from $A_5$, $A_4$, $A_3$, $A_2$, $A_1$, $A_0$ to $A_0$, $A_5$, $A_4$, $A_3$, $A_2$, $A_1$, allowing the $A_0$ bit to alternately switch from lower to upper memory address space of the selected channel's memory block in membership value table 70. It will be seen that the upper memory space, i.e., $A_0=1$, has the lower membership value threshold and the upper half knowledge-data of the function, and the lower memory space, i.e., $A_0=0$, has the upper membership value threshold and the lower half knowledge-data of the function. Thresholds for all three functions are used for first assessing whether the digitized sensor sample is within the domain of the function.

Thus, referring again to Tables I-III, there may be seen the manner in which the grade-of-membership address space, represented by $A_0$ to $A_5$, cooperates with channel select and function select parameters, under the present invention. First referring to Table I, there is seen channel select bits CS1, CS2 and CS3, with each containing the value 0. These settings, of course, indicate that channel 0 has been selected. There is also seen function select bits FS1, FS2 and FS3, with FS1 containing the value 1 and FS2 and FS3 each containing the value 0. Since FS1 corresponds to the Z-function, the value 1 contained therein selects the level-set data (knowledge-data) therefor. Accordingly, the lower address space depicted by the first row corresponds to the membership threshold value for the Z-function. Similarly, the upper address space depicted by the last row corresponds to the end flag.

Similarly, Table II shows channel select bits CS1, CS2 and CS3, with CS1 containing the value 1 and CS2 and CS3 each containing the value 0. These settings indicate that channel 1 has been selected. There is also seen function select bits FS1, FS2 and FS3, with FS2 containing the value 1 and FS1 and FS3 each containing the value 0. Since FS2 corresponds to the S-function, the value 1 contained therein selects the level-set data (knowledge-data) therefor. Accordingly, the lower address space depicted by the first row corresponds to the membership threshold value for the S-function. Similarly, the upper address space depicted by the last row corresponds to the end flag.

Table III shows channel select bits CS1, CS2 and CS3, with CS2 containing the value 1 and CS1 and CS3 each containing the value 0. These settings indicate that channel 2 has been selected. There is also seen function select bits FS1, FS2 and FS3, with FS3 containing the value 1 and FS2 and FS3 rach containing the value 0. Since FS3 corresponds to the PI-function, the value 1 contained therein selects the level-set data (Knowledge-data) therefor. Accordingly, the first address of the lower address space depicted by the first row with $A_0=0$, $A_5=0$, $A_4=0$, $A_3=0$, $A_2=0$, and $A_1=0$, corresponds to the upper membership threshold value (MTV) for the PI-function. The address space depicted by the second row with $A_0=0$, $A_5=1$, $A_4=1$, $A_3=1$, $A_2=1$, and $A_1=0$, corresponds to the last data value (LDV) for the left half of the PI-function. The address space depicted by the third row with $A_0=0$, $A_5=1$, $A_4=1$, $A_3=1$, $A_2=1$, and $A_1=1$, corresponds to the end flag which is detected by 200 to terminate the conversion. The first address of the upper address space depicted by the fourth row with $A_0=1$, $A_5=0$, $A_4=0$, $A_3=0$, $A_2=0$, and $A_1=0$, corresponds to the lower membership threshold value for the PI-function. Similarly, the address space depicted by the last row with $A_0=1$, $A_5=1$, $A_4=1$, $A_3=1$, $A_2=1$, and $A_1=0$, corresponds to the last data value for the right half of the PI-function.

Still referring to the PI function in Table III, it should be apparent to those skilled in the art that $A_0$ is used to alternately switch between the upper and lower half of the address space within the channel's section of memory in 70. To maintain symmetry, 31 upper and 31 lower address spaces are used for determining membership values. The 63rd address space is used for the end flag. In the actual circuit, of course, $A_0$ alternates between values 1 and 0 each time the membership value generator 52 is incremented.

As should be clear to those skilled in the art, the incremental alternating address for PI-functions allows switching between lower and upper half of the address space containing the corresponding upper and lower abscissa parameters of the function to allow one membership value per pair, lower and upper, of level-set data values. It should also be clear to those skilled in the art that the computer simply performs a single shift right of the contents of 34 to arrive at the membership function for the data sample. This, of course, is only for PI-functions. Hence, for PI-functions only and to maintain symmetry, there should preferably be N odd address locations in a particular block of the EEPROM, where the total address space would be divided between the upper and lower allowable parameters stored with the remaining or last address being used for the end flag.

Referring to the circuitry shown in FIGS. 3A-E, there are 31 each of upper and lower parameters and an end flag at the last or 63rd address. The first 2 values in 70, upper and lower, establish the membership value threshold of the PI-function. If the sample is not within these two values, the conversion is terminated. Otherwise, comparator 100 continues comparing the digitized sample from 154 using function table level-set data values from 70 until the membership value is ascertained or the end flag signal LST_VLU(L) is detected.

For Z- and S-membership functions, the first EEPROM value fetched is the membership value threshold which establishes initial confirmation/disconfirmation of the data sample which the instant reconfigurable fuzzy cell is assessing. Afterwards, the lower address of the EEPROM is incremented sequentially until the sensor data sample's membership value is ascertained or the end of the channel's function table memory block is reached.

In accordance with the present invention, for all 3 membership functions, the last value residing in the appropriate memory space is the end flag for terminating the conversion, i.e., membership value of data sample is 1.0. For Z- and S-functions, this termination occurs at the $N=64$ address space, i.e., at the bottom of memory space. For PI-functions, the end flag resides at $N-1$ or at the $N=63$ address space to maintain symmetry. It is a feature of the present invention that this approach for delimiting the level-set data for a given channel allows the flexibility of changing the number of membership values represented by the 8-bit counter embodying membership value generator 52 without impacting the hardware.

The central processor reconfigures function/membership value table 70 by first issuing a cell reset command signal C_OFF at micro address buffer 19 and transmitting it to cell control logic block 172 of cell control logic circuitry 170. As should be evident to those skilled in the art, this insures that the cell is disabled and that the interface buffers are enabled to the cell for processor access. With the sample request SMPL_RQT signal off (controlled by the central processor), the function and channel select bits are used for selecting the appropriate memory region of the EEPROM, and using the lower 6 address bits, load the new level-set data that constitutes the membership function for the channel selected. It should be clearly understood that although the interface shown in the schematic in FIGS. 3 A-E incorporates a 8-bit synchronous processor, simple circuit modifications would permit 16- or 32-bit asynchronous processors to be used.

For any function selected the data contained in the EEPROM represents the knowledge response/output of sensor data in a digital form of the process/mechanistic system being monitored. For each data value in 70, a membership value is assigned which is represented by the address generated, i.e., the ordinate of the membership function, by membership value generator 52. For PI-functions, a membership value is assigned to each X(N) lower and X(N) upper pair of values. For S- and Z-functions, only one membership value is assigned to each data value in 70. For example, the Z-function could have digital value 80 hex as address 00 hex located in membership value table 70. Therefore, if the digitized value obtained from the reconfigurable fuzzy cell's ADC 154 is determined in comparator 100 to be less than or equal to this value, its initial membership value would be 0. Consequently, the membership value generator 52 would be incremented and the next compare performed in comparator 100. This sequence continues until one of the hereinbefore described two conditions for cell cycle membership value conversion termination occurs: either the sensor data sample's membership value is determined or the end of the channel's function table memory region is reached.

It should be clear to those skilled in the art that the values stored in membership value table 70 represent the maximum value an analog-to-digital converter would output due to quantization and other system error. For example, if 80 hex were known to the membership value threshold of the measured process, then a 1 pcm count should preferably be added yielding 81 hex as the value to store at address 00 hex for that channel/function selected.

In accordance with the present invention, the design of the last value detect logic 200 permits the flexibility of reprogramming the end flag LST_VLU(L). This is accomplished by preferably using erasable programmable logic array devices (EPLA) as shown in FIGS. 3A and E. Hence, if the number of membership values requirement changes, the erasable programmable logic array (EPLA) may easily be reprogrammed or even replaced with another EPLA. By situating the EPLA where it monitors the EEPROM output, the end flag can, in turn, be situated anywhere in a particular channel function memory region. Hence, for the circuit depicted in FIGS. 3A-E, the Z- and S-functions have a max memory region of 64 address. It should be noted, however, that the end flag could be situated at the 32 address location, or any other address within that region to accommodate N membership values for a given channel/function combination. As should be evident to those skilled in the art, the end flag should be a value not ordinarily digitized sensor data. As should be evident from FIGS. 3A and E, the circuit has the capability to extend the number of membership values to 256 for S- and Z-functions, and to 127 for PI-functions.

As hereinbefore described, a learn mode is available under the present invention. Still referring to FIGS. 3A and E, the disable-cell DIS_CELL, clear-inhibit CLR_INHBT(L), and cell-inhibit CELL_INHBT(L) signals can be invoked in block 172 of cell control logic circuit 170 to permit only data acquisition of digitized sensor data using the sample request SMPL_RQT signal from 6, micro address decode 17, raw data storage 36, control signals from 178, and the gain and channel select bit from 32. Upon completion of the conversion process, the sample ready SMPL_RDY signal is sent to central fuzzy controller via 6 to read from the raw data storage device 36. This mode allows the digital raw data acquired from the selected sensor channel to be used in a learning/fuzzy algorithm located in the computer to determine membership values. When the learning-/membership value determination has been completed for a particular channel, i.e., level-set data of the function, the fuzzy controller dumps the data into EEPROM in the address order that the data address is to represent the membership value of sensor data samples. That is, for Z-, S-functions, the first value if the membership value threshold; for PI-functions, the first two values, stored in alternating A0 bit, are the membership value thresholds, i.e., the upper and lower thresholds, respectively. Subsequent values are loaded until the final value is the end flag for the current memory region.

Referring again to FIG. 11, there may be seen the chronological relationship between the various signals generated and used by the reconfigurable fuzzy cell, based upon typical timings therefor. As depicted therein, time $t_{CYCLE}$ represents the time conversion between samples; $t_{EOC}$ represents the analog-to-digital conversion time; $t_{ASU}$ represents the address setup time before function/membership table 70 is enabled; $t_{LTH}$ represents the address-to-membership latch time; $t_{IPT}$ represents the maximum interrupt processing time before the next sample; $t_{LEO}$ represents the time that membership latch to function/membership table is disabled; and $t_{PD}$ represents the interrupt pulse duration. Thus, there is shown the duration of the sample request SMPL_RQT and sample ready SMPL_RDY signals in $t_{EOC}$. It is seen that interrupt pulse, identified as "IN-TRUPT," has duration $t_{PD}$ which is cause either by the membership value being determined or by end-flag detection. Address 00H is shown containing the first compare value. For Z- and S-functions this corresponds to the membership threshold value. For PI-function, this corresponds to the upper threshold value; the lower threshold value is contained in the second address, namely, 01H, which is generated by the first membership value generator clock pulse MBR_CLK if the data sample 154 was less than or equal to the upper threshold value.

Figure 7:
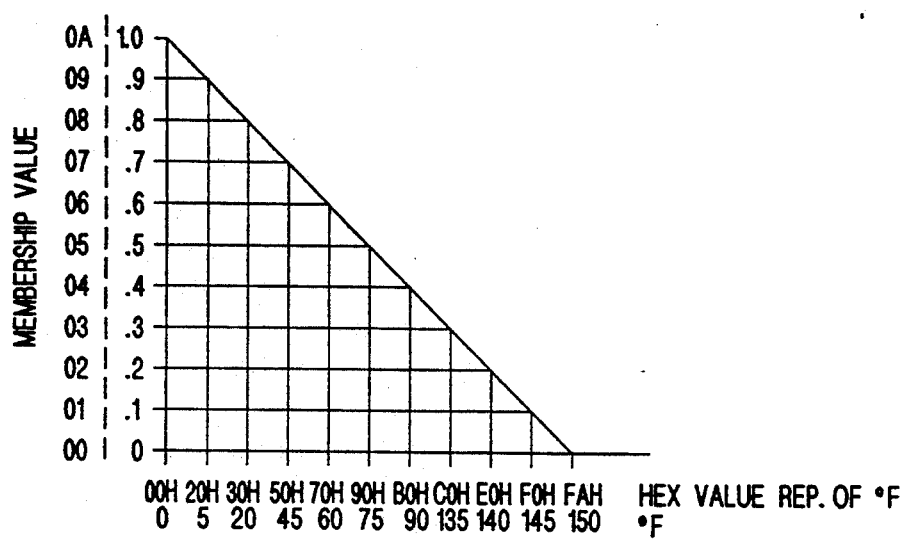
FIG. 7 depicts a plot of a representative Z-function with temperature measurement data and corresponding knowledge data on the horizontal axis, and membership value on the vertical axis.
Figure 8:
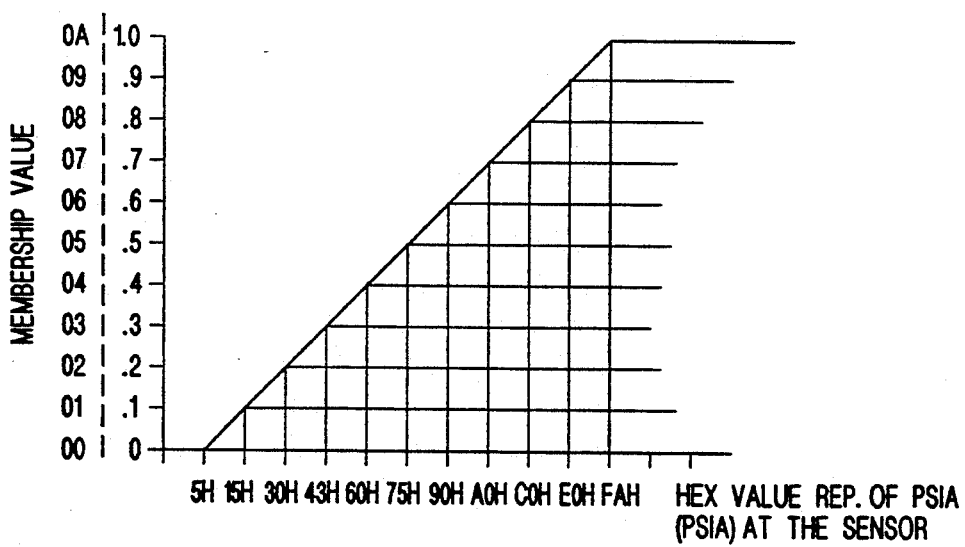
FIG. 8 depicts a plot of a representative S-fucntion with temperature measurement data and corresponding knowledge data on the horizontal axis, and membership value on the vertical axis.
Figure 9:
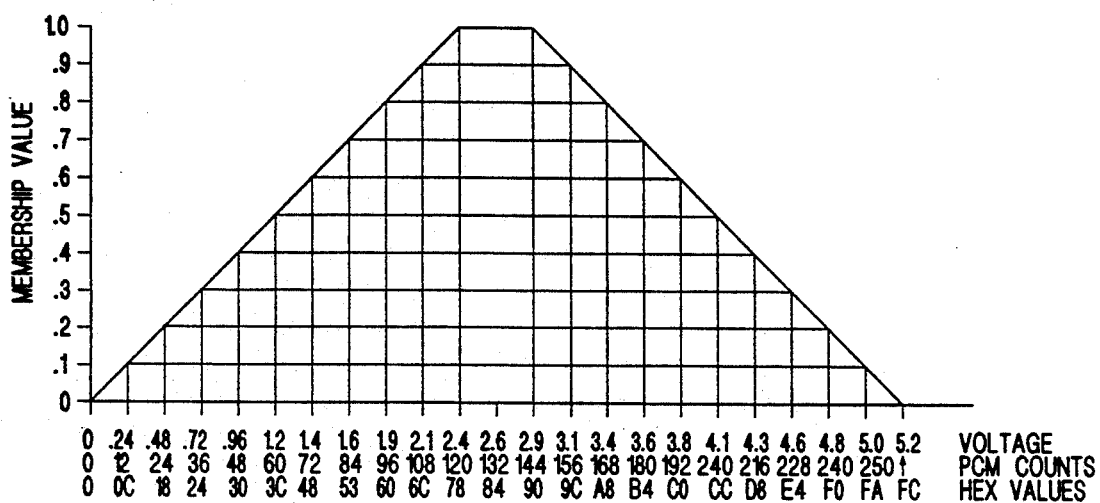
FIG. 9 depicts a plot of a representative PI-function with target tracking measurement data and corresponding knowledge data on the horizontal axis, and membership value on the vertical axis.

FIGS. 7, 8 and 9 show how the preferred embodiment of the present invention represent Z-, S-, and PI-functions, respectively. Specifically referring to FIG. 7, there is seen temperature measurement data collected on channel 0. The raw temperature data measured in ° F and the scaled hex value equivalent or knowledge-data are shown on the horizontal axis. For example, 0° F. is equivalent to 00 hex, 20° F. is equivalent to 30 hex, 90° F. is equivalent to B0 hex, and 150° F. is equivalent to FA hex. The vertical axis shows the membership value in the conventional 0.0 to 1.0 range and the hex address representation thereof generated by membership value generator 52 in accordance with the present invention. In this example, the membership function shown in FIG. 7 represents the fuzzy set "somewhat cold" for channel 0.

The memory map in membership value table 70 is depicted in Table IV. Addresses $A_{11}$, $A_{10}$ and $A_9$ contain the information stored in channel select bits, CS1, CS2, and CS3. Addresses $A_8$, $A_7$ and $A_6$ contain the information stored in function select bits, FS1 (Z-function), FS2 (S-function), and FS3 (PI-function). Since this example relates to the Z-function for channel 0, the values stored in memory are $A_{11}=0$, $A_{10}=0$, and $A_9=0$; $A_8=0$, $A_7=0$, and $A_6=1$. As hereinbefore described in detail, these values are obtained from cell parameter latch 32. The grade-of-membership representation in increments of 0.1 are shown with the hex value thereof, as obtained from membership value generator 52.

To illustrate the application of the fuzzy level-set information depicted in Table IV, suppose that channel 0 when sampled and digitized has a value of 68 hex.

TABLE IV

Z-FUNCTION MEMORY MAP

| CHANNEL SELECT | | | FUNCTION SELECT | | | GRADE-OF-MEMBERSHIP REPRESENTATION | | | | | | | |
|---|---|---|---|---|---|---|---|---|---|---|---|---|---|
| CS3 | CS2 | CS1 | PI | S | Z | MEMBER- | | | ADDRESS | | | | |
| $A_{11}$ | $A_{10}$ | $A_9$ | $A_8$ | $A_7$ | $A_6$ | SHIP | $A_5$ | $A_4$ | $A_3$ | $A_2$ | $A_1$ | $A_0$ | CONTENTS |
| 0 | 0 | 0 | 0 | 0 | 1 | 0 | 0 | 0 | 0 | 0 | 0 | 0 | (Membership Value Threshold) FAH |
| 0 | 0 | 0 | 0 | 0 | 1 | .1 | 0 | 0 | 0 | 0 | 0 | 1 | F0H |
| 0 | 0 | 0 | 0 | 0 | 1 | .2 | 0 | 0 | 0 | 0 | 1 | 1 | E0H |
| 0 | 0 | 0 | 0 | 0 | 1 | .3 | 0 | 0 | 0 | 1 | 1 | 0 | C0H |
| 0 | 0 | 0 | 0 | 0 | 1 | .4 | 0 | 0 | 0 | 1 | 0 | 0 | B0H |
| 0 | 0 | 0 | 0 | 0 | 1 | .5 | 0 | 0 | 0 | 1 | 0 | 1 | 90H |
| 0 | 0 | 0 | 0 | 0 | 1 | .6 | 0 | 0 | 0 | 1 | 1 | 0 | 70H |
| 0 | 0 | 0 | 0 | 0 | 1 | .7 | 0 | 0 | 0 | 1 | 1 | 1 | 50H |
| 0 | 0 | 0 | 0 | 0 | 1 | .8 | 0 | 0 | 1 | 0 | 0 | 0 | 30H |
| 0 | 0 | 0 | 0 | 0 | 1 | .9 | 0 | 0 | 1 | 0 | 0 | 1 | 20H |
| 0 | 0 | 0 | 0 | 0 | 1 | 1.0 | 0 | 0 | 1 | 0 | 1 | 0 | 00H |
| 0 | 0 | 0 | 0 | 0 | 1 |  | 0 | 0 | 1 | 0 | 1 | 1 | (End Flag) FEH |

Table V shows the processing which would occur in accordance with the present invention.

TABLE V

Z-FUNCTION CHANNEL 0 WITH DIGITIZED VALUE OF 68H

| MEMBERSHIP VALUE GENERATOR OUTPUT | | | | | | MVT OUTPUT CONTENTS | COMPARISON (CONFIRM/ DISCONFIRM) | |
|---|---|---|---|---|---|---|---|---|
| $A_5$ | $A_4$ | $A_3$ | $A_2$ | $A_1$ | $A_0$ | | | |
| 0 | 0 | 0 | 0 | 0 | 0 | latched | FAH | 68H≦FAH yes |
| 0 | 0 | 0 | 0 | 0 | 1 | latched | F0H | 68H≦F0H yes |
| 0 | 0 | 0 | 0 | 1 | 0 | latched | E0H | 68H≦E0H yes |
| 0 | 0 | 0 | 0 | 1 | 1 | latched | C0H | 68H≦C0H yes |
| 0 | 0 | 0 | 1 | 0 | 0 | latched | B0H | 68H≦B0H yes |
| 0 | 0 | 0 | 1 | 0 | 1 | latched | 90H | 68H≦90H yes |
| 0 | 0 | 0 | 1 | 1 | 0 | latched | 70H | 68H≦70H yes |
| 0 | 0 | 0 | 1 | 1 | 1 | not latched | 50H | 68H≦50H no |

In particular, shown therein are the values of the membership value generator output, membership value table (MVT) output, and the comparison based upon deconfirmation/disconfirmation logic. Thus, as depicted in the extreme right column, each MVT output value is compared against the particular threshold value until either a "no" result to the less-than-or-equal-logical condition or the end flag is reached. In this example, the membership value obtained is "000110" corresponding to 70 hex, in turn, corresponding to a grade-of-membership of approximately 0.6. Therefore, the temperature measurement has a degree of membership of 0.6 in the fuzzy set "somewhat cold."

Now specifically referring to FIG. 8, there is seen pressure measurement data collected on channel 6. The raw pressure data measured in psia and the scaled hex value equivalent or knowledge-data are shown on the horizontal axis. For example, 3 psia is equivalent to 05 hex, 9 psia is equivalent to 30 hex, 20 psia is equivalent to A0 hex, and 34 psia is equivalent to FA hex. The vertical axis shows the membership value in the conventional 0.0 to 1.0 range and the hex address representation thereof generated by membership value generator 52 in accordance with the present invention. In this example, the membership function shown in FIG. 8 represents the fuzzy set "slightly low pressure" for channel 6.

The memory map in membership value table 70 is depicted in Table VI. Addresses $A_{11}$, $A_{10}$ and $A_9$ contain the information stored in channel select bits, CS1, CS2, and CS3. Addresses $A_8$, $A_7$ and $A_6$ contain the information stored in function select bits, FS1 (Z-function), FS2 (S-function), and FS3 (PI-function). Since this example relates to the S-function for channel 6, the values stored in memory are $A_{11}=1$, $A_{10}=1$, and $A_9=0$; $A_8=0$, $A_7=1$, and $A_6=0$. As hereinbefore described in detail, these values are obtained from cell parameter latch 32. The grade-of-membership representation in increments of 0.1 are shown with the hex value thereof, as obtained from membership value generator 52.

To illustrate the application of the fuzzy level-set information depicted in Table VI, suppose that channel 6 when sampled and digitized has a value of 36 hex.

TABLE VI

S-FUNCTION MEMORY MAP

| CHANNEL SELECT | | | FUNCTION SELECT | | | GRADE-OF-MEMBERSHIP REPRESENTATION | | | | | | | |
|---|---|---|---|---|---|---|---|---|---|---|---|---|---|
| CS1 | CS2 | CS3 | PI | S | Z | | | | ADDRESS | | | | |
| $A_{11}$ | $A_{10}$ | $A_9$ | $A_8$ | $A_7$ | $A_6$ | MEMBERSHIP | $A_5$ | $A_4$ | $A_3$ | $A_2$ | $A_1$ | $A_0$ | CONTENTS |
| 1 | 1 | 0 | 0 | 1 | 0 | 0 | 0 | 0 | 0 | 0 | 0 | 0 | (Membership Value Threshold) 5H |
| 1 | 1 | 0 | 0 | 1 | 0 | .1 | 0 | 0 | 0 | 0 | 0 | 1 | 15H |
| 1 | 1 | 0 | 0 | 1 | 0 | .2 | 0 | 0 | 0 | 0 | 1 | 0 | 30H |
| 1 | 1 | 0 | 0 | 1 | 0 | .3 | 0 | 0 | 0 | 0 | 1 | 1 | 43H |
| 1 | 1 | 0 | 0 | 1 | 0 | .4 | 0 | 0 | 0 | 1 | 0 | 0 | 60H |
| 1 | 1 | 0 | 0 | 1 | 0 | .5 | 0 | 0 | 0 | 1 | 0 | 1 | 75H |
| 1 | 1 | 0 | 0 | 1 | 0 | .6 | 0 | 0 | 0 | 1 | 1 | 0 | 90H |

TABLE VI-continued

| CHANNEL SELECT | | | FUNCTION SELECT | | | S-FUNCTION MEMORY MAP GRADE-OF-MEMBERSHIP REPRESENTATION | | | | | | | |
|---|---|---|---|---|---|---|---|---|---|---|---|---|---|
| CS1 | CS2 | CS3 | PI | S | Z | | ADDRESS | | | | | | |
| $A_{11}$ | $A_{10}$ | $A_9$ | $A_8$ | $A_7$ | $A_6$ | MEMBERSHIP | $A_5$ | $A_4$ | $A_3$ | $A_2$ | $A_1$ | $A_0$ | CONTENTS |
| 1 | 1 | 0 | 0 | 1 | 0 | .7 | 0 | 0 | 0 | 1 | 1 | 1 | A0H |
| 1 | 1 | 0 | 0 | 1 | 0 | .8 | 0 | 0 | 1 | 0 | 0 | 0 | C0H |
| 1 | 1 | 0 | 0 | 1 | 0 | .9 | 0 | 0 | 1 | 0 | 0 | 1 | E0H |
| 1 | 1 | 0 | 0 | 1 | 0 | 1.0 | 0 | 0 | 1 | 0 | 1 | 0 | FAH |
| 1 | 1 | 0 | 0 | 1 | 0 | | 0 | 0 | 1 | 0 | 1 | 1 | (End Flag) FEH |

Table VII shows the processing which would occur in accordance with the present invention.

TABLE VII
S-FUNCTION
CHANNEL 6 WITH DIGITIZED VALUE OF 36H

| MEMBERSHIP VALUE GENERATOR | | | | | | | MVT OUTPUT CONTENTS | COMPARISON (CONFIRM/ DISCONFIRM) | |
|---|---|---|---|---|---|---|---|---|---|
| $A_5$ | $A_4$ | $A_3$ | $A_2$ | $A_1$ | $A_0$ | | | | |
| 0 | 0 | 0 | 0 | 0 | 0 | latched | 05H | 36H≦05H | yes |
| 0 | 0 | 0 | 0 | 0 | 1 | latched | 15H | 36H≦15H | yes |
| 0 | 0 | 0 | 0 | 1 | 0 | latched | 30H | 36H≦30H | yes |
| 0 | 0 | 0 | 0 | 1 | 1 | not latched | 43H | 36H≦43H | no |
| 0 | 0 | 0 | 1 | 0 | 0 | | 60H | | |
| 0 | 0 | 0 | 1 | 0 | 1 | | 75H | | |
| 0 | 0 | 0 | 1 | 1 | 0 | | 90H | | |
| 0 | 0 | 0 | 1 | 1 | 1 | | | | |
| 0 | 0 | 1 | 0 | 0 | 0 | | | | |
| 0 | 0 | 1 | 0 | 0 | 1 | | | | |

In particular, shown therein are the values of the membership value generator output, membership value table output, and the comparison based upon confirmation/disconfirmation logic. Thus, as depicted in the extreme right column, each MVT output value is compared against the particular threshold value until either a "no" result to the greater-than-or-equal logical condition or the end flag is reached. In this example, the membership value obtained is "000010" corresponding to 30 hex, in turn, corresponding to a grade-of-membership of approximately 0.2. Therefore, the pressure measurement has a degree of membership of 0.2 in the fuzzy set "slightly low pressure."

Figure 10:
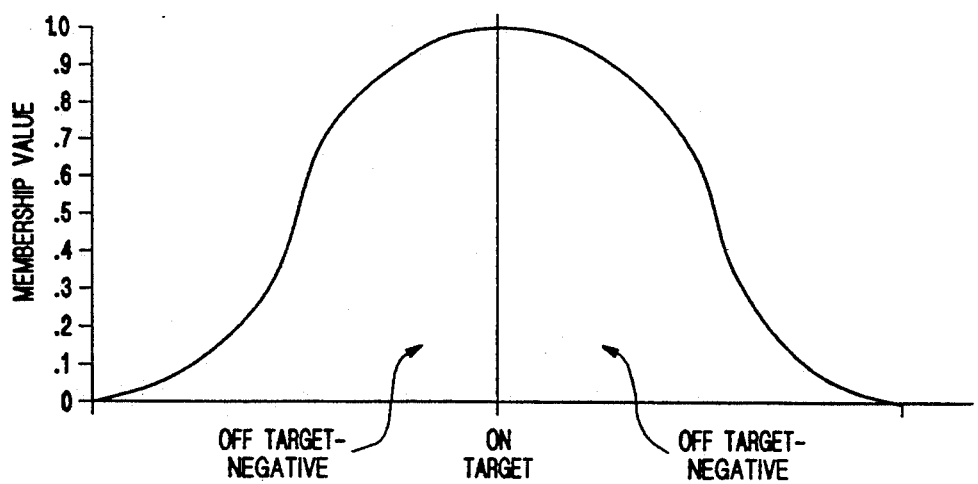
FIG. 10 depicts the membership value characteristics of the PI-function with target tracking measurement data shown in FIG. 9.

Now specifically referring to FIG. 9, there is seen target measurement data, conforming to the characteristics depicted in FIG. 10, tracked on channel 4. The raw target data measured in voltage and pcm counts and the scaled hex value equivalent or knowledge-data are shown on the horizontal axis. For example, 0.24 volts and 12 pcm are each equivalent to 0C hex; 2.6 volts and 132 pcm are each equivalent to 84 hex; and 5.2 volts and 252 pcm are each is equivalent to FC hex. The vertical axis shows the membership value in the conventional 0.0 to 1.0 range and the hex address representation thereof generated by membership value generator 52 in accordance with the present invention. In this example, the membership function shown in FIG. 9 represents the fuzzy set "reasonably on target."

The memory map in membership value table 70 is depicted in Table VIII. Since this example relates to the PI-function for channel 4, the values stored in memory are $A_{11}=1$, $A_{10}=0$, and $A_9=0$; $A_8=1$, $A_7=0$, and $A_6=0$. As hereinbefore described in detail, these values are obtained from cell parameter latch 32. The grade-of-membership representation in increments of 0.1 are shown with the hex value thereof, as obtained from membership value generator 52. As hereinbefore described in detail, the first series of rows with membership value from 0 to 1.0 correspond to lower address space containing the upper limit membership value thresholds and knowledge-data for the right half of the curve, with the end flag being the last byte. The second series of rows with membership value from 0 to 1.0 correspond to upper address space containing the lower limit membership value thresholds and knowledge-data for the left half of the curve.

For PI-function operations, the function select PI bit enables the lower buffer which switches the membership value generator address lines into the lower address space of the membership value table 70 from $A_5$, $A_4$, $A_3$, $A_2$, $A_1$, $A_0$ to $A_0$, $A_5$, $A_4$, $A_3$, $A_2$, $A_1$, allowing the $A_0$ bit to alternately switch from lower to upper memory address space for each clock pulse MBR_CLK applied to 52. Therefore, when the reconfigurable cell is active, in accordance with the present invention, and the membership value generator (with $A_0$ alternating) is being incremented, the membership value table has the configuration shown in Table VIII.

TABLE VIII

| MEMBERSHIP VALUE GENERATOR | | | | | | PI-FUNCTION OUTPUT ADDRESS FROM SWITCHER TO MEMBERSHIP VALUE TABLE | | | | | | MEMBERSHIP VALUE OUTPUT | MEMBERSHIP VALUE |
|---|---|---|---|---|---|---|---|---|---|---|---|---|---|
| $A_5$ | $A_4$ | $A_3$ | $A_2$ | $A_1$ | $A_0$ | $A_0$ | $A_5$ | $A_4$ | $A_3$ | $A_2$ | $A_1$ | | |
| 0 | 0 | 0 | 0 | 0 | 0 | 0 | 0 | 0 | 0 | 0 | 0 | FCH | 0 |
| 0 | 0 | 0 | 0 | 0 | 1 | 1 | 0 | 0 | 0 | 0 | 0 | 00H | 0 |
| 0 | 0 | 0 | 0 | 1 | 0 | 0 | 0 | 0 | 0 | 0 | 1 | FAH | .1 |
| 0 | 0 | 0 | 0 | 1 | 1 | 1 | 0 | 0 | 0 | 0 | 1 | 0CH | .1 |
| 0 | 0 | 0 | 1 | 0 | 0 | 0 | 0 | 0 | 0 | 1 | 0 | F0H | .2 |
| 0 | 0 | 0 | 1 | 0 | 1 | 1 | 0 | 0 | 0 | 1 | 0 | 18H | .2 |
| 0 | 0 | 0 | 1 | 1 | 0 | 0 | 0 | 0 | 0 | 1 | 1 | E4H | .3 |
| 0 | 0 | 0 | 1 | 1 | 1 | 1 | 0 | 0 | 0 | 1 | 1 | 24H | .3 |
| 0 | 0 | 1 | 0 | 0 | 0 | 0 | 0 | 0 | 1 | 0 | 0 | D8H | .4 |
| 0 | 0 | 1 | 0 | 0 | 1 | 1 | 0 | 0 | 1 | 0 | 0 | 30H | .4 |

TABLE VIII-continued

| MEMBERSHIP VALUE GENERATOR | | | | | | PI-FUNCTION OUTPUT ADDRESS FROM SWITCHER TO MEMBERSHIP VALUE TABLE | | | | | | MEMBERSHIP VALUE OUTPUT | MEMBERSHIP VALUE |
|---|---|---|---|---|---|---|---|---|---|---|---|---|---|
| $A_5$ | $A_4$ | $A_3$ | $A_2$ | $A_1$ | $A_0$ | $A_0$ | $A_5$ | $A_4$ | $A_3$ | $A_2$ | $A_1$ | | |
| 0 | 0 | 1 | 0 | 1 | 0 | 0 | 0 | 0 | 1 | 0 | 1 | CCH | .5 |
| 0 | 0 | 1 | 0 | 1 | 1 | 1 | 0 | 0 | 1 | 0 | 1 | 3CH | .5 |
| 0 | 0 | 1 | 1 | 0 | 0 | 0 | 0 | 0 | 1 | 1 | 0 | C0H | .6 |
| 0 | 0 | 1 | 1 | 0 | 1 | 1 | 0 | 0 | 1 | 1 | 0 | 48H | .6 |
| 0 | 0 | 1 | 1 | 1 | 0 | 0 | 0 | 0 | 1 | 1 | 1 | B4H | .7 |
| 0 | 0 | 1 | 1 | 1 | 1 | 1 | 0 | 0 | 1 | 1 | 1 | 53H | .7 |
| 0 | 1 | 0 | 0 | 0 | 0 | 0 | 0 | 1 | 0 | 0 | 0 | A8H | .8 |
| 0 | 1 | 0 | 0 | 0 | 1 | 1 | 0 | 1 | 0 | 0 | 0 | 60H | .8 |
| 0 | 1 | 0 | 0 | 1 | 0 | 0 | 0 | 1 | 0 | 0 | 1 | 9CH | .9 |
| 0 | 1 | 0 | 0 | 1 | 1 | 1 | 0 | 1 | 0 | 0 | 1 | 6CH | .9 |
| 0 | 1 | 0 | 1 | 0 | 0 | 0 | 0 | 1 | 0 | 1 | 0 | 90H | 1.0 |
| 0 | 1 | 0 | 1 | 0 | 1 | 1 | 0 | 1 | 0 | 1 | 0 | 78H | 1.0 |
| 0 | 1 | 0 | 1 | 1 | 0 | 0 | 0 | 1 | 0 | 1 | 1 | FEH | END FLAG |

To illustrate the application of the fuzzy level-set information depicted in Table IX, suppose that channel 4 when sampled and digitized has a value of 4.2 volts or CD hex.

TABLE IX

| CHANNEL SELECT | | | FUNCTION SELECT | | | PI-FUNCTION MEMORY MAP MEMBERSHIP VALUE | GRADE-OF-MEMBERSHIP REPRESENTATION | | | | | | CONTENTS |
|---|---|---|---|---|---|---|---|---|---|---|---|---|---|
| $A_{11}$ | $A_{10}$ | $A_9$ | $A_8$ | $A_7$ | $A_6$ | | $A_5$ | $A_4$ | $A_3$ | $A_2$ | $A_1$ | $A_0$ | |
| 1 | 0 | 0 | 1 | 0 | 0 | 0 | 0 | 0 | 0 | 0 | 0 | 0 | FCH (Upper Threshold Value) |
| 1 | 0 | 0 | 1 | 0 | 0 | .1 | 0 | 0 | 0 | 0 | 0 | 1 | FAH |
| 1 | 0 | 0 | 1 | 0 | 0 | .2 | 0 | 0 | 0 | 0 | 1 | 0 | F0H |
| 1 | 0 | 0 | 1 | 0 | 0 | .3 | 0 | 0 | 0 | 0 | 1 | 1 | E4H |
| 1 | 0 | 0 | 1 | 0 | 0 | .4 | 0 | 0 | 0 | 1 | 0 | 0 | D8H |
| 1 | 0 | 0 | 1 | 0 | 0 | .5 | 0 | 0 | 0 | 1 | 0 | 1 | CCH |
| 1 | 0 | 0 | 1 | 0 | 0 | .6 | 0 | 0 | 0 | 1 | 1 | 0 | C0H |
| 1 | 0 | 0 | 1 | 0 | 0 | .7 | 0 | 0 | 0 | 1 | 1 | 1 | B4H |
| 1 | 0 | 0 | 1 | 0 | 0 | .8 | 0 | 0 | 1 | 0 | 0 | 0 | A8H |
| 1 | 0 | 0 | 1 | 0 | 0 | .9 | 0 | 0 | 1 | 0 | 0 | 1 | 9CH |
| 1 | 0 | 0 | 1 | 0 | 0 | 1.0 | 0 | 0 | 1 | 0 | 1 | 0 | 90H |
| 1 | 0 | 0 | 1 | 0 | 0 | | 0 | 0 | 1 | 0 | 1 | 1 | FEH (END FLAG) |
| 1 | 0 | 0 | 1 | 0 | 0 | 0 | 1 | 0 | 0 | 0 | 0 | 0 | 00H (Lower Threshold Value) |
| 1 | 0 | 0 | 1 | 0 | 0 | .1 | 1 | 0 | 0 | 0 | 0 | 1 | 0CH |
| 1 | 0 | 0 | 1 | 0 | 0 | .2 | 1 | 0 | 0 | 0 | 1 | 0 | 18H |
| 1 | 0 | 0 | 1 | 0 | 0 | .3 | 1 | 0 | 0 | 0 | 1 | 1 | 24H |
| 1 | 0 | 0 | 1 | 0 | 0 | .4 | 1 | 0 | 0 | 1 | 0 | 0 | 30H |
| 1 | 0 | 0 | 1 | 0 | 0 | .5 | 1 | 0 | 0 | 1 | 0 | 1 | 3CH |
| 1 | 0 | 0 | 1 | 0 | 0 | .6 | 1 | 0 | 0 | 1 | 1 | 0 | 48H |
| 1 | 0 | 0 | 1 | 0 | 0 | .7 | 1 | 0 | 0 | 1 | 1 | 1 | 53H |
| 1 | 0 | 0 | 1 | 0 | 0 | .8 | 1 | 0 | 1 | 0 | 0 | 0 | 60H |
| 1 | 0 | 0 | 1 | 0 | 0 | .9 | 1 | 0 | 1 | 0 | 0 | 1 | 6CH |
| 1 | 0 | 0 | 1 | 0 | 0 | 1.0 | 1 | 0 | 1 | 0 | 1 | 0 | 78H |

Table X shows the processing which would occur in accordance with the present invention.

TABLE X

PI FUNCTION CHANNEL 4 WITH DIGITIZED VALUE OF 4.2 VOLTS OR CDH

| MEMBERSHIP VALUE GENERATOR | | | | | | | MEMBERSHIP VALUE TABLE OUTPUT | | COMPARISON | |
|---|---|---|---|---|---|---|---|---|---|---|
| $A_5$ | $A_4$ | $A_3$ | $A_2$ | $A_1$ | $A_0$ | | | | | |
| | | | | | | latched | FCHex | upper threshold | CDH≦FCH | yes |
| 0 | 0 | 0 | 0 | 0 | 0 | latched | 00H | lower threshold | CDH≧00H | yes |
| 0 | 0 | 0 | 0 | 0 | 1 | latched | FAH | upper threshold | CDH≦FAH | yes |
| 0 | 0 | 0 | 0 | 1 | 0 | latched | 0CH | lower threshold | CDH≧0CH | yes |
| 0 | 0 | 0 | 0 | 1 | 1 | latched | F0H | upper threshold | CDH≦F0H | yes |
| 0 | 0 | 0 | 1 | 0 | 0 | latched | 18H | lower threshold | CDH≧18H | yes |
| 0 | 0 | 0 | 1 | 0 | 1 | latched | E4H | upper threshold | CDH≦E4H | yes |
| 0 | 0 | 0 | 1 | 1 | 0 | latched | 24H | lower threshold | CDH≧24H | yes |
| 0 | 0 | 0 | 1 | 1 | 1 | latched | D8H | upper threshold | CDH≦D8H | yes |
| 0 | 0 | 1 | 0 | 0 | 0 | latched | 30H | lower threshold | CDH≧30H | no |

TABLE X-continued

PI FUNCTION
CHANNEL 4 WITH DIGITIZED VALUE OF 4.2 VOLTS OR CDH

| MEMBERSHIP VALUE GENERATOR | | | | | | | MEMBERSHIP VALUE TABLE OUTPUT | | COMPARISON | |
|---|---|---|---|---|---|---|---|---|---|---|
| 0 | 0 | 1 | 0 | 0 | 1 | not latched | CCH | upper threshold | CDH≧CCH | yes |

In particular, shown therein are the values of the membership value generator output, membership value table output, and the comparison based upon confirmation/disconfirmation logic. Thus, as depicted in the extreme right column, each MVT output value is compared against the particular pair of upper and lower threshold values, in turn, until either a "no" result alternately to the less-than-or-equal logical condition or the end flag is reached. In this example, the membership value obtained is "001001" corresponding to CC hex, in turn, corresponding to a grade-of-membership of approximately 0.4. Therefore, the target measurement has a degree of membership of 0.4 in the fuzzy set "reasonably on target."

It should be clearly understood that there are other variations and alternative embodiments of the present invention without deviating from the concept thereof. It is an advantage and feature of the present invention that a highly flexible reconfigurable electronic circuit that allows high throughput raw data to grade of membership conversions is provided. As an example, the signal conditioned, multiplex sensor input and the analog-to-digital converter could be replaced with a discrete input port or ports that would at timed intervals provide digital words representing other mechanistic inputs such as speech, spectral features, e.g., energy, frequency, or time duration in a certain spectrum of a spoken word such as in speech recognition. As another example, based on the present invention's flexibility, an additional dedicated state machine concomitantly with a digital-to-analog converter to provide a simplified cell controller for monitor and control of a given process. Thus, parameters such as pressure and acceleration or motion in robotics would each be sampled and converted into their binary representation, and then into their membership values. For a two-input data configuration, as an illustration, both membership values would be applied to a table-driven max/min state machine that would determine the fuzzy value result. This value would, in turn, be fed to a membership-to-binary value translator containing the knowledge of the system which would be fed to the digital-to-analog converter's input. The output of the digital-to-analog converter would be correction voltage for controlling physical systems, e.g., motor speed of water inlet or pressure valve.

The cell design within the concept of the present invention could also be used for logging membership values of a given channel over a period of time before an interrupt is issued to the central fuzzy controller or processor. This, of course, would allow blocks of membership values to be acquired for each channel before any processing, i.e. fuzzy mathematics, is performed.

With the aid of an additional EEPROM complex functions can be realized allowing unlimited capability in accommodating virtually any function. The output address of the membership value generator would select EEPROM No. 1 containing the data of the fuzzy level-set value and EEPROM No. 2 containing the associated membership values. For each knowledge-data value in EEPROM No. 1, EEPROM NO. 2 outputs the associated membership value. If the raw digital samples are within the level-set of the membership function, the membership value from EEPROM No. 2 is then latched.

The present invention's capability of converting raw data, either analog or discrete, into its grade-of-membership solely in hardware allows for a high throughput real time fuzzy system as heretofore unknown in the prior art, which has been based upon software implementations of conversion schemes. Furthermore, the flexibility of the hardware allows ease of membership function changes as new requirements occur, avoiding costly hardware changeover and down times. The present invention's ability to handle multi-input sensor data makes its use attractive in embedded real time fuzzy systems where different mechanistic inputs from a single physical system are to be treated mathematically by a fuzzy controller. In addition, the modular design allows a building block approach to more sophisticated fuzzy system applications.

It is an important advantage of the present invention that the data of the level-sets which make up the Z-, S- and PI-functions, or combinations thereof, can be readily reprogrammed with the hardware remaining in situ and on-line. The flexible design inherent in the present invention is based on-line system reconfigurability: the internal firmware that controls the reconfigurable cells function selection and channel selection in multi-input data systems and its select channel membership functions reprogramming capability. Also, the cell's modular design enables multiple fuzzy cells to be integrated together as membership coprocessors in a distributive fuzzy system. The cell's design allows different digital interface options since its design is not dependent on any particular interface.

Moreover, the hardware comprising the present invention can be reconfigured for learning only where digitized raw data from a select channel is acquired from a process running and upon determination of the level-set data comprising the membership function for that channel by a central fuzzy controller/processor, the particular channels memory block of the EEPROM can be reconfigured. It is another advantage of the present invention that since the circuit components are off-the-shelf, it is possible to implement a version thereof using application-specific integrated circuits to arrive at a comparable one-chip fuzzy cell solution in embedded applications such as embedding a single channel version of the instant cell into a sensor.

Other variations and modifications will, of course, become apparent from a consideration of the features hereinbefore described and depicted. Accordingly, it should be clearly understood that the present invention is not intended to be limited by the particular features hereinbefore described and depicted in the accompanying drawings, but that the concept of the present invention is to be measured by the scope of the claims herein.

I claim:

1. In a computer system, an in situ reconfigurable fuzzy cell for converting raw analog sensor data into membership value in fuzzy sets based upon comparison with a Z-, S-, or PI-function level-set, or a hybrid thereof, said reconfigurable fuzzy cell comprising:

nonvolatile memory means for storing bits of data corresponding to said Z-, S-, or PI-function level set in a plurality of address spaces;

data/parameter interface means for storing digital representation of the sensor data, said membership value of the sensor data, and parametric information and transmitting portions of said parametric information as selected parametric signals;

control circuit means for controlling and coordinating the operation of said reconfigurable fuzzy cell by generating control signals and using parametric signals;

analog interface circuit means responsive to said control signals and containing a plurality of sensor channels, for receiving and converting said analog sensor data into said digital representation thereof in response to said parametric signals;

membership value circuit means responsive to said control signals, for determining the membership value of said digital representation of said sensor data from each of the plurality of sensor channels based upon said selected parametric signals; and bus interface circuit means also responsive to said control signals, for transmitting selection of said parametric signals to said data/parameter interface means and transmitting said digital representation of said sensor data and said membership value of said sensor data to said computer system.

2. The reconfigurable fuzzy cell described in claim 1, wherein said membership value circuit means includes membership table means contained in said nonvolatile memory means and storing level-set data for each said function.

3. The reconfigurable fuzzy cell described in claim 2, wherein said membership value circuit means includes line switcher means to select, in accordance with said selected parameter signals, the appropriate of said plurality of address spaces in said nonvolatile memory means containing said level-set data for comparison with said digital representation of said sensor data.

4. The reconfigurable fuzzy cell described in claim 3, wherein said membership value circuit means further includes comparator means to deduce membership value.

5. The reconfigurable fuzzy cell described in claim 4, wherein said membership value circuit means further includes membership value generating means for retrieving said level-set data based upon said address spaces selected by said line switcher means, for comparison with said digital representation of said sensor data in said comparator means.

6. The reconfigurable fuzzy cell described in claim 5, wherein said membership value circuit means further includes confirmation/disconfirmation means for evaluating output of said comparator means and feeding back the result thereof to said membership value circuit means.

7. The reconfigurable fuzzy cell described in claim 5, wherein said membership value circuit means further includes last value detect means in said membership table means for detecting when said address spaces containing said selected level-set data have reached a last value condition.

8. The reconfigurable fuzzy cell described in claim 1, wherein said data/parameter interface means includes pluralities of gain, membership function, and channel selection parameters and said selected parametric signals represent selections from each plurality.

9. The reconfigurable fuzzy cell described in claim 1, wherein said data/parameter interface means includes raw digital sensor data storage means and membership value data storage means.

10. The reconfigurable fuzzy cell described in claim 1, wherein said analog interface means includes a programmable gain operational amplifier means for scaling said sensor data based upon said parametric signals.

11. The reconfigurable fuzzy cell described in claim 1, wherein said analog interface circuit means responsive to said control signals by said computer system generates said digital representation of said sensor data.

12. The reconfigurable fuzzy cell described in claim 1, wherein any selected portion of said level-set data stored in said membership table means is reconfigurable in situ.

13. In a computer system, an in situ reconfigurable fuzzy cell for converting raw analog sensor data into membership value fuzzy sets based upon comparison with a Z-, S-, or PI-function level-set, or a hybrid thereof, said reconfigurable fuzzy cell comprising:

nonvolatile memory means for storing bits of data corresponding to said Z-, S-, or PI-function level set in a plurality of address spaces;

control circuit means for controlling and coordinating the operation of said reconfigurable fuzzy cell by generating control signals and using parametric signals;

data/parameter interface means including gain, function and channel selection parameters which may be transmitted as parametric signals, for storing and transmitting said parametric signals, and further including raw digital sensor data storage means and level-set membership data storage means;

analog interface circuit means responsive to said control signals and containing a plurality of sensor channels, for receiving and converting said analog sensor data into digital representation responsive to said parametric signals; said analog interface circuit means including a programmable gain operational amplifier means for scaling said sensor data based upon said parametric signals;

membership value circuit means responsive to said control signals, for determining the membership value of said digital representation of said sensor data in said level-set selected based upon said parametric signals; said membership value circuit comprising:

membership table means contained in said nonvolatile memory means and storing level-set data for each said function;

line switcher means to select, in accordance with parametric signals, the appropriate of said plurality of address spaces in said nonvolatile memory means containing said level-set data for comparison with said digital representation of said sensor data;

last value detect means in said membership table means for detecting when said address spaces containing said selected level-set data have reached a last value condition;

comparator means for comparing said digital representation of said sensor data with said level-set data contained in selected address spaces of said memory means to produce an output;

membership value generating means for retrieving said level-set data based upon said address spaces selected by said line switcher means, for comparison with said digital representation of said sensor data in said comparator means;

confirmation/disconfirmation means for evaluating the output of said comparator means and feeding back the result thereof to said membership value circuit means; and bus interface circuit means also responsive to said control signals, for transmitting said parametric information to said data/parameter interface means and transmitting said membership value and said digital representation of said sensor data to said computer system.

14. The reconfigurable fuzzy cell described in claim 13, wherein said analog interface circuit means responsive to said control signals by said computer system generates said digital representation of said sensor data.

15. The reconfigurable fuzzy cell described in claim 13, wherein said level-set data stored in said membership table means is reconfigurable in situ.

16. In a computing system having a control logic, the method of converting analog sensor data into membership value data in fuzzy sets based upon comparison with a selected one of a plurality of membership function level-sets stored in nonvolatile memory, said method comprising the steps:

loading, for selection therefrom, a plurality of channel selection, gain, and membership function parameters into a data parameter interface logic circuit;

storing in said nonvolatile memory level-set data for at least one membership function, said level-set data containing a last value flag, location of said last value flag being variable for each analog sensor channel selected for conversion to membership value data;

selecting the gain;

selecting the analog sensor channel as source of analog data;

selecting the membership function having desired membership level-set;

converting analog data from selected sensor channel to bytes of digital data representative thereof;

selectively addressing level-set data of said nonvolatile memory corresponding to selected membership function;

determining that the threshold byte or bytes of digital data is/are within the selected membership level-set;

comparing a particular byte of digital data with appropriate membership level-set data from said nonvolatile memory for a comparator output;

determining if said comparator output for said particular byte satisfies conditions for qualification as a membership value and, if so, storing level-set data corresponding to such comparator output as a current membership value in said data parameter interface logic circuit;

comparing each additional byte of digital data with appropriate membership level-set data until said comparator output no longer satisfies conditions for qualification as a membership value or last value flag is detected, in either event, the conversion process is terminated and the current membership value stored in the data parameter interface logic circuit becomes the membership value for the sensor data.

17. The method of claim 16 wherein the gain is selected by setting a programmable gain amplifier.

18. The method of claim 16 wherein the step of addressing level-set data corresponding to selected membership function may comprise addressing more than one address for each byte of digital data.

19. The method of claim 16 wherein said level-set data for a membership function stored in said nonvolatile memory may be replaced and read back while computer system is on line by inhibiting the control logic thereof.

20. The method of claim 16 wherein said step of selecting the analog sensor channel comprises varying the rate at which said step is performed to accommodate available bandwidth.

* * * * *